(12) United States Patent
Hinton

(10) Patent No.: US 9,143,502 B2
(45) Date of Patent: Sep. 22, 2015

(54) METHOD AND SYSTEM FOR SECURE BINDING REGISTER NAME IDENTIFIER PROFILE

(75) Inventor: Heather Maria Hinton, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2201 days.

(21) Appl. No.: 11/010,228

(22) Filed: Dec. 10, 2004

(65) Prior Publication Data

US 2006/0129816 A1   Jun. 15, 2006

(51) Int. Cl.
*H04L 29/06* (2006.01)
*G06F 21/41* (2013.01)

(52) U.S. Cl.
CPC ............ *H04L 63/0815* (2013.01); *G06F 21/41* (2013.01)

(58) Field of Classification Search
USPC ............................................................ 726/8
See application file for complete search history.

(56) References Cited

U.S. PATENT DOCUMENTS

| | | | |
|---|---|---|---|
| 7,058,817 B1 * | 6/2006 | Ellmore | 713/183 |
| 7,137,141 B1 * | 11/2006 | McClanahan | 726/8 |
| 7,185,364 B2 * | 2/2007 | Knouse et al. | 726/8 |
| 7,188,252 B1 * | 3/2007 | Dunn | 713/182 |
| 7,194,764 B2 * | 3/2007 | Martherus et al. | 726/8 |
| 7,209,734 B2 * | 4/2007 | Maes | 455/414.1 |
| 7,231,661 B1 * | 6/2007 | Villavicencio et al. | 726/4 |
| 7,243,369 B2 * | 7/2007 | Bhat et al. | 726/6 |
| 7,266,839 B2 * | 9/2007 | Bowers et al. | 726/8 |
| 7,290,288 B2 * | 10/2007 | Gregg et al. | 726/28 |
| 7,389,273 B2 * | 6/2008 | Irwin et al. | 705/59 |
| 7,428,750 B1 * | 9/2008 | Dunn et al. | 726/8 |
| 7,505,760 B2 * | 3/2009 | Hurst et al. | 455/414.1 |

(Continued)

FOREIGN PATENT DOCUMENTS

WO   WO03049000   6/2003

OTHER PUBLICATIONS

Hamada, Takeo. Dynamic Role Creation from Role Class Hierarchy. Global Convergence of Telecommunications and Distributed Object Computing, 1997. Proceedings, TINA 97. Pub. Date: 1997. Relevant pp. 152-163. http://ieeexplore.ieee.org/stamp/stamp.jsp?tp=&arnumber=660720.*

(Continued)

*Primary Examiner* — Dede Zecher
*Assistant Examiner* — Jeremiah Avery
(74) *Attorney, Agent, or Firm* — Jeffrey S. LaBaw; David H. Judson

(57) ABSTRACT

A method, a system, an apparatus, and a computer program product are presented for improving a register name identifier profile within a federated computing environment such that the register name identifier profile is enhanced to be more securely binding between two federated entities within the federated computing environment, such as an identity provider and a service provider. After the first federated entity sends a register name identifier request for a principal to the second federated entity, the second federated entity performs an authentication operation for the principal. In response to successfully completing the authentication operation, the second federated entity registers or modifies a name identifier for the principal that has been extracted from the received register name identifier request.

30 Claims, 11 Drawing Sheets

(56) References Cited

U.S. PATENT DOCUMENTS

| | | | |
|---|---|---|---|
| 2003/0149781 A1* | 8/2003 | Yared et al. | 709/229 |
| 2003/0172090 A1* | 9/2003 | Asunmaa et al. | 707/200 |
| 2005/0063333 A1* | 3/2005 | Patron et al. | 370/329 |
| 2005/0124320 A1* | 6/2005 | Ernst et al. | 455/411 |
| 2005/0137981 A1* | 6/2005 | Maes | 705/44 |
| 2005/0262355 A1* | 11/2005 | Banet et al. | 713/180 |
| 2006/0155993 A1* | 7/2006 | Busboon | 713/169 |

OTHER PUBLICATIONS

Weaver, Alfred C. Enforcing Distributed Data Security via Web Services. 2004 IEEE International Workshop on Factory Communication Systems, 2004. Proceedings. Pub. Date: 2004. Relevant pp. 397-402. http://ieeexplore.ieee.org/stamp/stamp.jsp?tp=&arnumber=1377757.*

* cited by examiner

**ENHANCED REGISTER NAME IDENTIFIER PROFILE
(INITIATED AT IDENTITY PROVIDER -- PRELIMINARY SINGLE-SIGN-ON)**

**ENHANCED REGISTER NAME IDENTIFIER PROFILE
(INITIATED AT IDENTITY PROVIDER -- PULL-TYPE SINGLE-SIGN-ON)**

METHOD AND SYSTEM FOR SECURE BINDING REGISTER NAME IDENTIFIER PROFILE

BACKGROUND OF THE INVENTION

1. Field of the Invention

The present invention relates to an improved data processing system and, in particular, to a method and apparatus for multicomputer data transferring. Still more particularly, the present invention is directed to networked computer systems.

2. Description of Related Art

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources. Users generally desire the ability to change from interacting with one application to another application without regard to authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications have a Web-based user interface that is accessible through a common browser, users expect more user-friendliness and low or infrequent barriers to movement from one Web-based application to another. In this context, users are coming to expect the ability to jump from interacting with an application on one Internet domain to another application on another domain without regard to the authentication barriers that protect each particular domain. However, even if many systems provide secure authentication through easy-to-use, Web-based interfaces, a user may still be forced to reckon with multiple authentication processes that stymie user access across a set of domains. Subjecting a user to multiple authentication processes in a given time frame may significantly affect the user's efficiency.

For example, various techniques have been used to reduce authentication burdens on users and computer system administrators. These techniques are generally described as "single-sign-on" (SSO) processes because they have a common purpose: after a user has completed a sign-on operation, i.e. been authenticated, the user is subsequently not required to perform another authentication operation. Hence, the goal is that the user would be required to complete only one authentication process during a particular user session.

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely on the user's identity provider for primary management of the user's authentication credentials, e.g., accepting a single-sign-on token that is provided by the user's identity provider.

As enterprises move to support federated business interactions, these enterprises should provide a user experience that reflects the increased cooperation between two businesses. As noted above, a user may authenticate to one party that acts as an identity provider and then single-sign-on to a federated business partner that acts as a service provider. In conjunction with this single-sign-on functionality, additional user lifecycle functionality, such as account linking/de-linking and single-sign-off, should also be supported.

Account-linking is a process by which two or more user accounts at different service providers are bound to a single user. This binding may be based on a user's public identity or similar identifier, sometimes referred to as a common unique identifier or a globally unique user identifier, which can be easily associated with a user; this binding may be based on a pseudonym, which is also known as an alias.

Account-linking is supported within the profiles that are defined by the Liberty Alliance Project. According to the Liberty Alliance specifications, a Liberty profile is a combination of a message content specification and a message transport mechanism specification for a single client type. The Liberty Alliance specifications group these various profiles into categories. Single-sign-on and federation profiles are those profiles by which a service provider obtains an authentication assertion from any identity provider that facilitates single-sign-on and identity federation. An identity provider is an entity that creates, maintains, and manages identity information about principals and provides principal authentication to other service providers with which it has trust relationships. A service provider is an entity that provides services and/or goods to a principal, which is an entity that can acquire a federated identity such that federated actions are performed on its behalf, such as an individual user, a corporation, or some other component of a federation. Single logout profiles are those profiles by which service providers and identity providers are notified of authenticated session termination. Name registration profiles are those profiles by which service providers and identity providers specify the name identifier to be used when communicating with each other about a principal.

In particular, the Liberty Alliance Project has defined a "register name identifier" (RNI) profile that is to be used to establish account-linking. The register name identifier profiles are those profiles by which a service provider or an identity provider may register or change a name identifier for a principal.

However, the register name identifier profile does not adequately identify the initial binding of a user to a local account on which an account-linking operation is based. More specifically, the Liberty Alliance specifications provide a scenario for secure account linking in one very specific instance: when initiated from a service provider to an identity provider, after a user has authenticated to a service provider, whereby the user is required to have a session with the identity provider. This scenario is initiated by setting an element, "Federate", to a boolean "true" value in the single-sign-on request; in response, the identity provider sends a single-sign-on response to the service provider at which the user has already been authenticated, which in turn requires that the service provider should be able to accommodate a single-sign-on response, even when the user has a valid session.

This scenario raises several implementation issues. For example, it may result in the improper resetting of a user's session credentials because they must be immediately reset to indicate that the user has authenticated through a single-sign-on operation from the identity provider instead of direct authentication with the service provider, i.e. instead of the authentication method that may have been accomplished before the single-sign-on operation; if the user's session credentials were not properly reset, then security has potentially been compromised because the user may have actions that are authorized by the service provider for directly authenticated users but that are not authorized for users that have performed a single-sign-on operation.

The "register name identifier" profile described by the Liberty Alliance specifications only allows for account binding/rebinding once this initial federation operation has been completed (binding/rebinding by the service provider, and rebinding only by the identity provider). Therefore, it would be advantageous to have methods and systems in which an enterprise can implement a register name identifier profile such that the register name identifier profile adequately identifies the initial binding of a user to a local account on which an account-linking operation is based.

SUMMARY OF THE INVENTION

A method, a system, an apparatus, and a computer program product are presented for improving a register name identifier profile within a federated computing environment such that the register name identifier profile is enhanced to be more securely binding between two federated entities within the federated computing environment, such as an identity provider and a service provider. After the first federated entity sends a register name identifier request for a principal to the second federated entity, the second federated entity performs an authentication operation for the principal. In response to successfully completing the authentication operation, the second federated entity registers or modifies a name identifier for the principal that has been extracted from the received register name identifier request.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
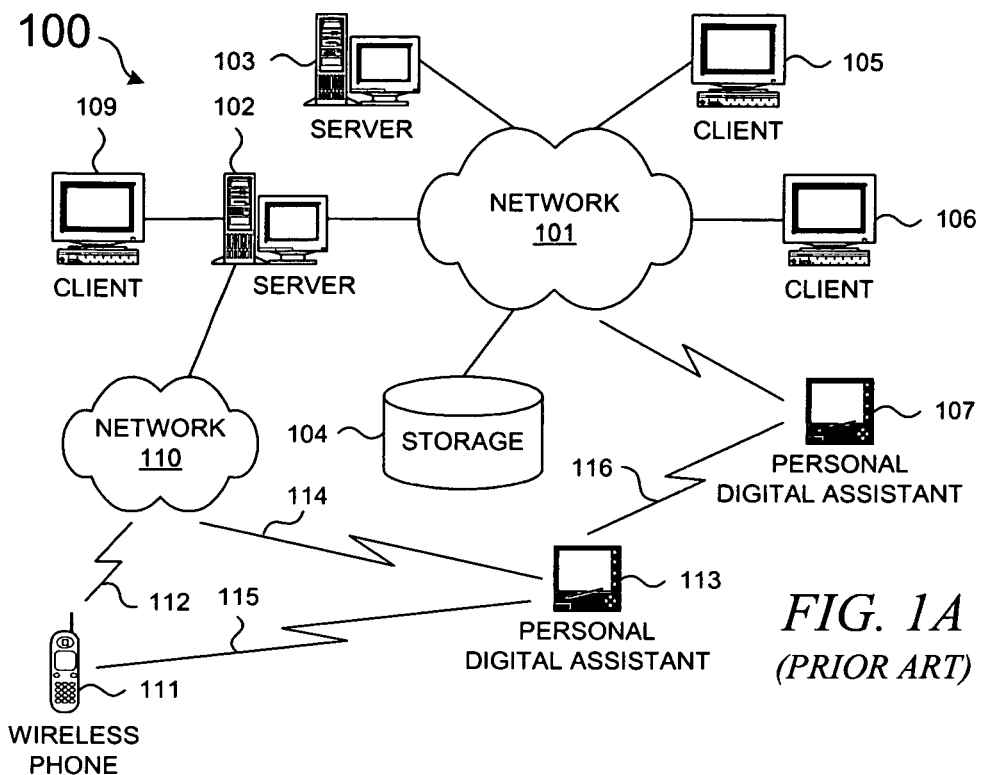
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
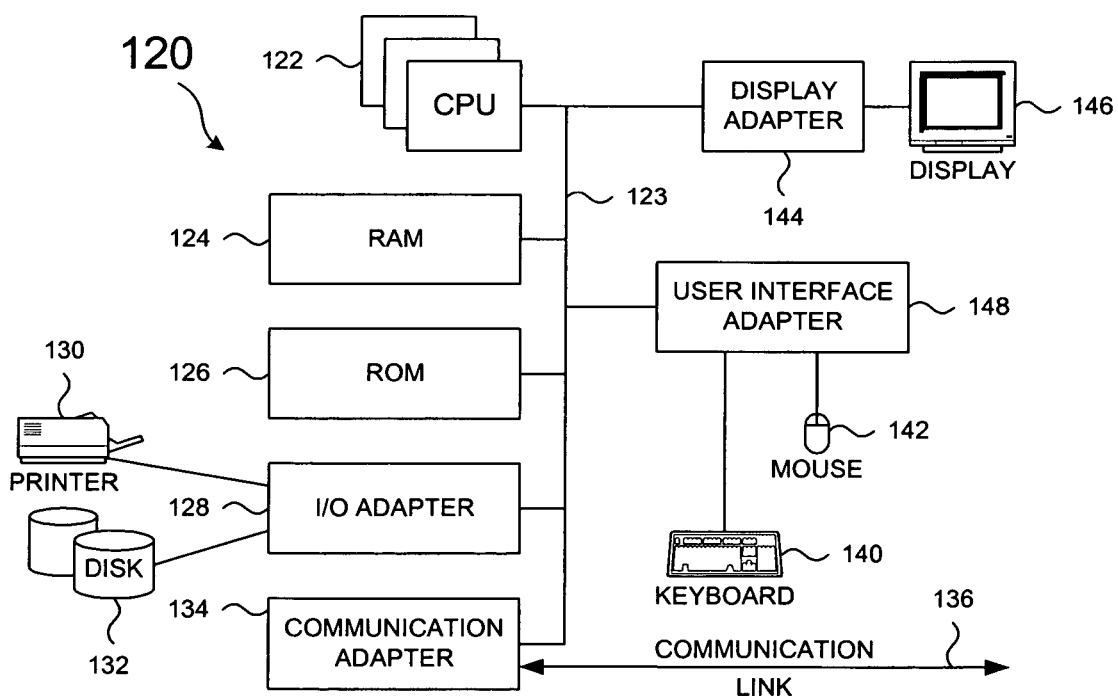
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
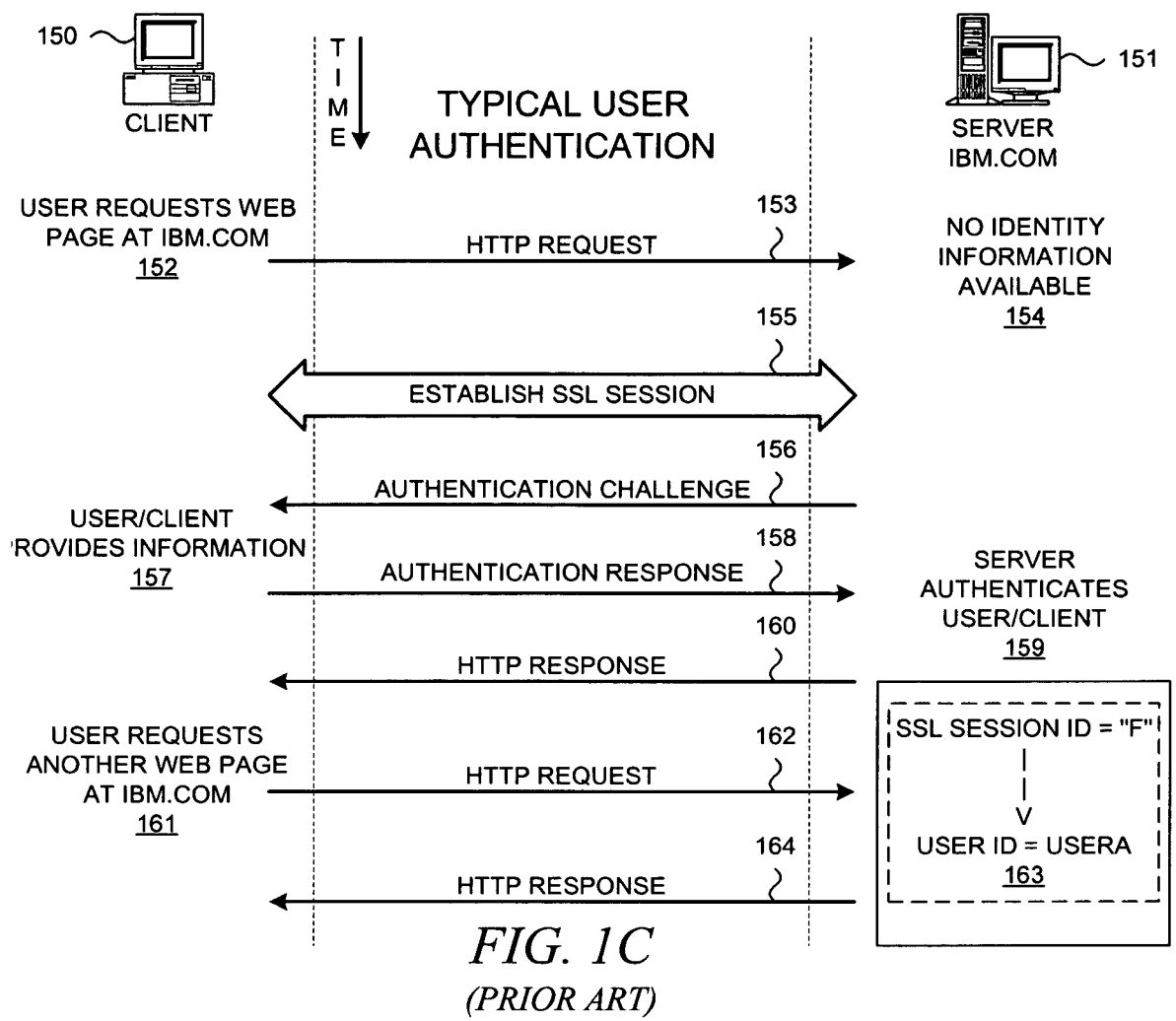
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and/or authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client. The server creates a session identifier for the client, and any subsequent request messages from the client within the session would be accompanied by the session identifier.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163) because the user's session identifier is returned to the server in the HTTP request message, and the server sends the requested web page back to the client in another HTTP response message (step 164). Although FIG. 1C depicts a typical prior art process, it should be noted that other alternative session state management techniques may be depicted, such as URL rewriting or using cookies to identify users with active sessions, which may include using the same cookie that is used to provide proof of authentication.

Figure 1D:
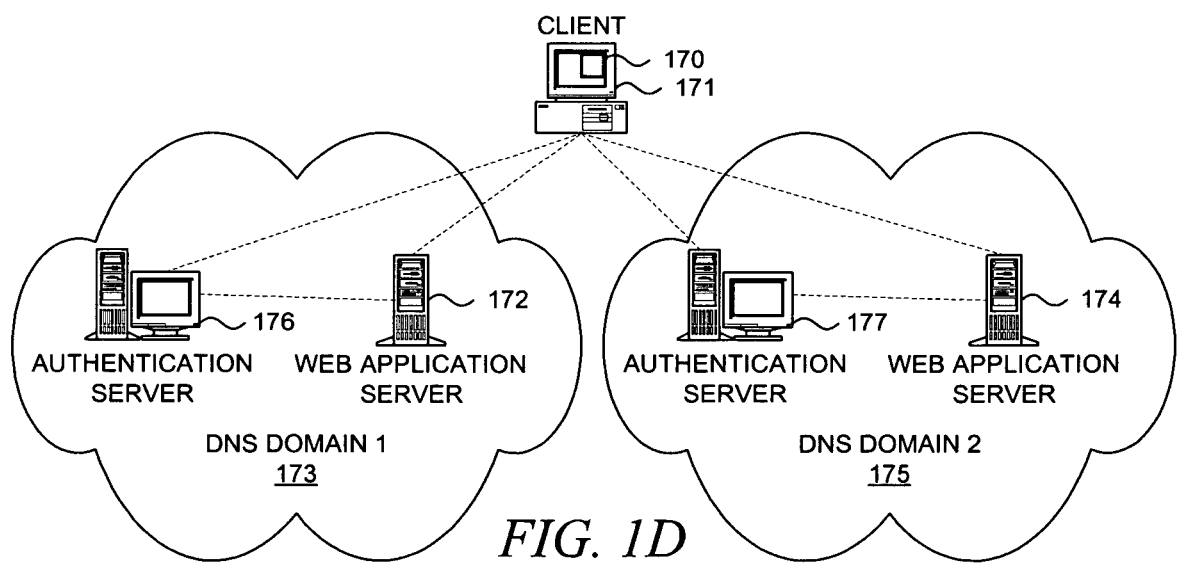
FIG. 1D depicts a network diagram that illustrates a typical Web-based environment in which the present invention may be implemented.

With reference now to FIG. 1D, a network diagram illustrates a typical Web-based environment in which the present invention may be implemented. In this environment, a user of a browser 170 at client 171 desires to access a protected resource on web application server 172 in DNS domain 173, or on web application server 174 in DNS domain 175.

In a manner similar to that shown in FIG. 1C, a user can request a protected resource at one of many domains. In contrast to FIG. 1C, which shows only a single server at a particular domain, each domain in FIG. 1D has multiple servers. In particular, each domain may have an associated authentication server 176 and 177.

In this example, after client 171 issues a request for a protected resource at domain 173, web application server 172 determines that it does not have an active session for client 171, and it requests that authentication server 176 perform an appropriate authentication operation with client 171. Authentication server 176 communicates the result of the authentication operation to web application server 172. If the user (or browser 170 or client 171 on behalf of the user) is successfully authenticated, then web application server 172 establishes a session for client 171 and returns the requested protected resource. Typically, once the user is authenticated by the authentication server, a cookie may be set and stored in a cookie cache in the browser. FIG. 1D is merely an example of one manner in which the processing resources of a domain may be shared amongst multiple servers, particularly to perform authentication operations.

In a similar manner, after client 171 issues a request for a protected resource at domain 175, authentication server 177 performs an appropriate authentication operation with client 171, after which web application server 174 establishes a session for client 171 and returns the requested protected resource. Hence, FIG. 1D illustrates that client 171 may have multiple concurrent sessions in different domains yet is required to complete multiple authentication operations to establish those concurrent sessions.

Figure 1E:
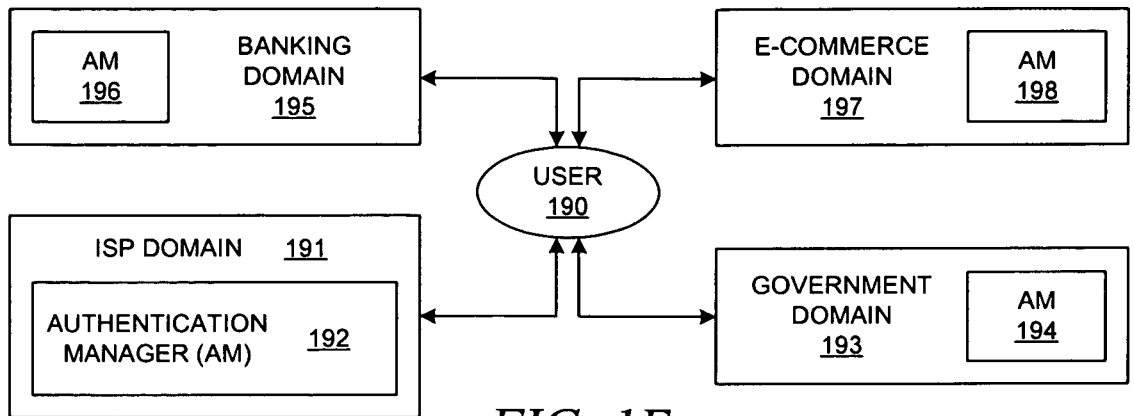
FIG. 1E depicts a block diagram that illustrates an example of a typical online transaction that might require multiple authentication operations from a user.

With reference now to FIG. 1E, a block diagram depicts an example of a typical online transaction that might require multiple authentication operations from a user. Referring again to FIG. 1C and FIG. 1D, a user may be required to complete an authentication operation prior to gaining access to a controlled resource, as shown in FIG. 1C. Although not shown in FIG. 1C, an authentication manager may be deployed on server 151 to retrieve and employ user information that is required to authenticate a user. As shown in FIG. 1D, a user may have multiple current sessions within different domains 173 and 175, and although they are not shown in FIG. 1D, each domain may employ an authentication manager in place of or in addition to the authentication servers. In a similar manner, FIG. 1E also depicts a set of domains, each of which support some type of authentication manager. FIG. 1E illustrates some of the difficulties that a user may experience when accessing multiple domains that require the user to complete an authentication operation for each domain.

User 190 may be registered at ISP domain 191, which may support authentication manager 192 that authenticates user 190 for the purpose of completing transactions with respect to domain 191. ISP domain 191 may be an Internet Service Provider (ISP) that provides Internet connection services, email services, and possibly other e-commerce services. Alternatively, ISP domain 191 may be an Internet portal that is frequently accessed by user 190.

Similarly, domains 193, 195, and 197 represent typical web service providers. Government domain 193 supports authentication manager 194 that authenticates users for completing various government-related transactions. Banking domain 195 supports authentication manager 196 that authenticates users for completing transactions with an online bank. E-commerce domain 197 supports authentication manager 198 that authenticates users for completing online purchases.

As noted previously, when a user attempts to move from one domain to another domain within the Internet or World Wide Web by accessing resources at the different domains, a user may be subjected to multiple user authentication requests or requirements, which can significantly slow the user's progress across a set of domains. Using FIG. 1E as an exemplary environment, user 190 may be involved in a complicated online transaction with e-commerce domain 197 in which the user is attempting to purchase an on-line service that is limited to users who are at least 18 years old and who have a valid driver license, a valid credit card, and a U.S. bank account. This online transaction may involve domains 191, 193, 195, and 197.

Typically, a user might not maintain an identity and/or attributes within each domain that participates in a typical online transaction. In this example, user 190 may have registered his or her identity with the user's ISP, but to complete the online transaction, the user might also be required to authenticate to domains 193, 195, and 197. If each of the domains does not maintain an identity for the user, then the user's online transaction may fail. Even if the user can be authenticated by each domain, then it is not guaranteed that the different domains can transfer information between themselves in order to complete the user's transaction.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, September 1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used within the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Register Name Identifier Profile

As mentioned above, the Liberty Alliance Project has defined a register name identifier profile that is to be used to establish account-linking. According to the prior art Liberty Alliance specifications, a Liberty profile is a combination of a message content specification and a message transport mechanism specification for a single client type. The register name identifier profiles are those profiles by which a service provider or an identity provider may register or change a name identifier for a principal, which are illustrated in FIGS. 2A and 2B.

Figure 2A:
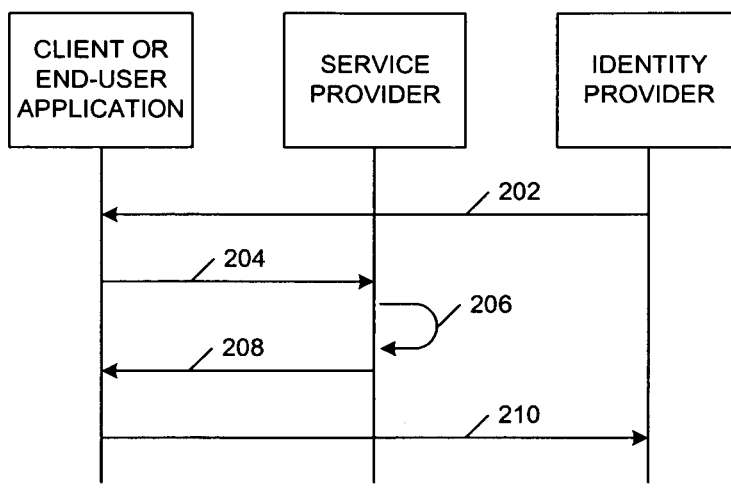
FIGS. 2A-2B depict dataflow diagrams that illustrate HTTP-redirect-based register name identifier profiles as defined within the Liberty Alliance specifications.
Figure 2B:
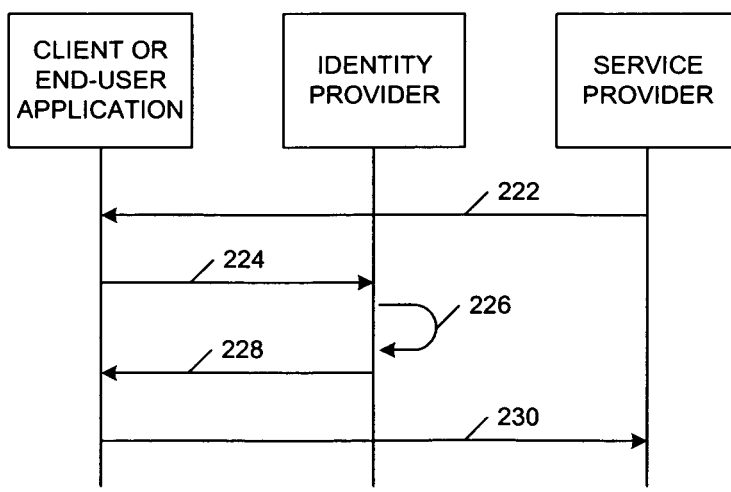

With reference now to FIG. 2A, a dataflow diagram depicts an HTTP-redirect-based register name identifier profile that is initiated by an identity provider as defined within the prior art Liberty Alliance specifications. An identity provider may change, i.e. register, the name identifier that has been assigned by the identity provider to a principal, known as "<lib:IDPProvidedNameIdentifier>", for a variety of reasons that are specific to an implementation of the prior art Liberty Alliance specifications; the newly assigned name identifier is transmitted by the identity provider to a service provider in the manner shown in FIG. 2A.

The HTTP-redirect-based register name identifier profile commences at the identity provider by sending an HTTP redirect message (HTTP Response message with status/reason code "302") to a client, also known as a user agent, such as a web browser application (step 202). The HTTP-redirect-based register name identifier profile cannot be self-initiated by an identity provider; it must be triggered by some type of message or interaction between the identity provider and another entity, either the user agent or a service provider, although the message has not been shown in FIG. 2A. The redirect message redirects the client to the appropriate location, e.g., as identified by a Uniform Resource Identifier (URI) within the "Location" header of the redirect message, of the Register Name Identifier service at the service provider. The "Location" HTTP header of the redirect message also includes a query component, e.g., appended to a URI and demarcated within the URI with a "?" character, that contains the "<lib:RegisterNameIdentifierRequest>" protocol message as defined within the prior art Liberty Alliance specifications.

In response to receiving the redirect message from the identity provider, the client sends an HTTP Get message to the Register Name Identifier service at the service provider as indicated by the URI in the HTTP redirect message from the identity provider (step 204). In this manner, the client accesses the Register Name Identifier service at the service provider because the URI in the HTTP Get message still contains the attached "<lib:RegisterNameIdentifierRequest>" message. Hence, the service provider processes the Register Name Identifier Request message (step 206), thereby registering the name identifier assigned by the identity provider to the principal.

After processing the Register Name Identifier Request message, the Register Name Identifier service at the service provider responds by sending an HTTP redirect message (HTTP Response message with status/reason code "302") to the client (step 208). The redirect message redirects the client to the identity provider using a return URI that was provided by the identity provider in a "RegisterNameIdentifierServiceReturnURL" metadata element within the Register Name Identifier Request message. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message as defined within the prior art Liberty Alliance specifications.

In response to receiving the redirect message from the service provider, the client sends an HTTP Get message to the identity provider as indicated by the URI in the HTTP redirect message from the service provider (step 210), thereby concluding the process. The client initiates the completion of the Register Name Identifier operation at the identity provider because the URI in the HTTP Get message from the client to the identity provider still contains the attached "<lib:RegisterNameIdentifierResponse>" message. As mentioned above, the HTTP-redirect-based register name identifier profile cannot be self-initiated by an identity provider and must be triggered by some type of message or interaction between the identity provider and another entity, either the user agent or a service provider; hence, additional processing steps, which have not been shown in FIG. 2A, may be completed after the Register Name Identifier Response message is received by the identity provider.

With reference now to FIG. 2B, a dataflow diagram depicts an HTTP-redirect-based register name identifier profile that is initiated by a service provider as defined within the prior art Liberty Alliance specifications. A service provider may change, i.e. register, the name identifier that has been provided by the service provider to a principal, known as "<lib:SPProvidedNameIdentifier>", for a variety of reasons that are specific to an implementation of the prior art Liberty Alliance specifications; the newly assigned name identifier is transmitted by the service provider to an identity provider in the manner shown in FIG. 2B. The service-provider-provided name identifier is the name identifier that the service provider expects the identity provider to use when the identity provider communicates with the service provider about a particular principal; until the service provider registers a service-provider-provided name identifier with the identity provider, the identity provider will continue to use the currently assigned identity-provider-provided name identifier when referring to the particular principal.

The HTTP-redirect-based register name identifier profile commences at the service provider by sending an HTTP redirect message (HTTP Response message with status/reason code "302") to a client, also known as a user agent, such as a web browser application (step 222). The HTTP-redirect-based register name identifier profile can be self-initiated by a service provider; other possible messages or interactions between the service provider and another entity, either the user agent or an identity provider, before the initiation of this process has not been shown in FIG. 2B. The redirect message redirects the client to the appropriate location, e.g., as identified by a URI within the "Location" header of the redirect message, of the Register Name Identifier service at the service provider. The "Location" HTTP header of the redirect message also includes a query component, e.g., appended to a URI and demarcated within the URI with a "?" character, that contains the "<lib:RegisterNameIdentifierRequest>" protocol message as defined within the prior art Liberty Alliance specifications.

In response to receiving the redirect message from the service provider, the client sends an HTTP Get message to the Register Name Identifier service at the identity provider as indicated by the URI in the HTTP redirect message from the service provider (step 224). In this manner, the client accesses the Register Name Identifier service at the identity provider because the URI in the HTTP Get message still contains the attached "<lib:RegisterNameIdentifierRequest>" message. Hence, the identity provider processes the Register Name Identifier Request message (step 226), thereby registering the name identifier provided by the service provider.

After processing the Register Name Identifier Request message, the Register Name Identifier service at the identity provider responds by sending an HTTP redirect message (HTTP Response message with status/reason code "302") to the client (step 228). The redirect message redirects the client to the service provider, e.g., using a return URI that was provided by the service provider within the Register Name Identifier Request message. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message as defined within the prior art Liberty Alliance specifications.

In response to receiving the redirect message from the identity provider, the client sends an HTTP Get message to the service provider as indicated by the URI in the HTTP redirect message from the identity provider (step 230), thereby concluding the process. The client initiates the completion of the Register Name Identifier operation at the service provider because the URI in the HTTP Get message from the client to the service provider still contains the attached "<lib:RegisterNameIdentifierResponse>" message. Additional processing steps, which have not been shown in FIG. 2B, may be completed after the Register Name Identifier Response message is received by the service provider.

As discussed above with respect to FIG. 2A and FIG. 2B, the register name identifier profiles are those profiles by which a service provider may request the registration of a name identifier for a principal, or by which an identity provider or an identity provider may change a name identifier for a principal in accordance with the prior art Liberty Alliance specifications.

The register name identifier profiles defined by the prior art Liberty Alliance specifications have two protocol implementations—an HTTP-redirect-based implementation and a SOAP/HTTP-based implementation. As mentioned above, with the HTTP-redirect-based binding, the entity or party that wishes to invoke the register name identifier must wait for an incoming HTTP request from the user; in other words, the HTTP-redirect-based register name identifier profile cannot be self-initiated. Hence, the register name identifier dataflows are interposed into the HTTP response, e.g., including initiating further GETs based on HTTP redirection, before completing with an HTTP GET and returning control to allow fulfillment of the initial HTTP request.

The initiation of the register name identifier dataflows within this scenario are bound to the user at the initiator entity or party. Hence, if the register name identifier profile is triggered from the identity provider, then this dataflow is triggered within the scope of a valid, authenticated session for the user at the identity provider. The register name identifier profiles do not require, however, that the user authenticate, or single-sign-on to the service provider for the scope of the register name identifier profile. Likewise, there is an implicit assumption that if these dataflows are invoked from a service provider, then the user has authenticated to the identity provider and thus performed a single-sign-on to the service provider; this is an incorrect assumption because the prior art Liberty Alliance specifications do not require that a service provider give up all rights to authenticate a user, even after federation.

In either scenario, there is no binding of the user's register name identifier request as initiated at the identity (service) provider to the user as known at the service (identity) provider. This means that there is no assurance that the request is actually for the user for which it is being performed; in addition, there is no assurance that the request is not being replayed or otherwise misused by the user or a malicious party.

Enhanced Resister Name Identifier Profile

The present invention addresses the above-noted inadequacies in the register name identifier profile as described in the Liberty Alliance specification by requiring that a user have a valid session at both parties, i.e. the identity provider and service provider, in order to complete an HTTP-redirect-based register name identifier flow. This approach requires a user, presumably the principal for which the register name identifier operation occurs, to authenticate (or perform a single-sign-on operation) to both the identity provider and the service provider during the register name identifier operation, as illustrated in more detail hereinbelow with respect to FIG. 3A and FIG. 3B. Although the exemplary embodiments that are illustrated within FIG. 3A and FIG. 3B employ HTTP-based communications, the present invention is not limited to HTTP-based communications, and other communication protocols may be employed.

Figure 3A:
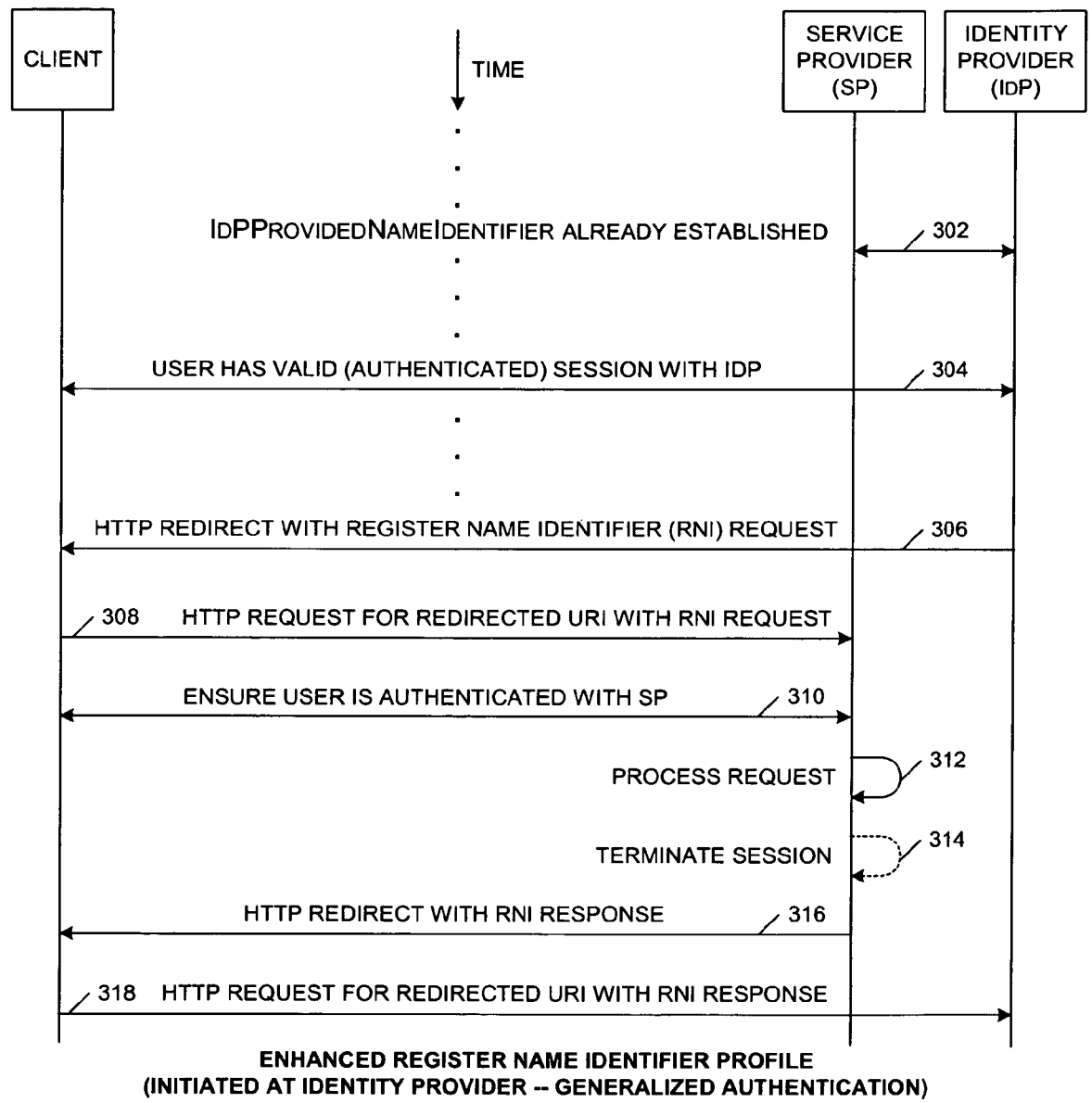
FIG. 3A depicts a dataflow diagram that illustrates an enhanced HTTP-redirect-based register name identifier (RNI) profile, including a generalized authentication step, that is initiated by an identity provider in accordance with an embodiment of the present invention.

With reference now to FIG. 3A, a dataflow diagram depicts an enhanced HTTP-redirect-based register name identifier (RNI) profile, including a generalized authentication step, that is initiated by an identity provider in accordance with an embodiment of the present invention. In a manner similar to that shown in FIG. 2A, FIG. 3A depicts a process by which an identity provider may change, i.e. register, a name identifier that has been assigned by the identity provider to a principal, known as "<lib:IDPProvidedNameIdentifier>", at the selected service provider, which may occur for a variety of implementation-specific reasons. However, the process that is shown in FIG. 3A differs from the process that is shown in FIG. 2A by the inclusion of an additional authentication step, as discussed hereinbelow.

The prerequisites for this dataflow are that the user has already linked the user's accounts at the identity provider and the service provider (step 302) and that the user has already authenticated to the identity provider (step 304). With step 302, the requirement is simply that "<lib:IDPProvidedNameIdentifier>", at a minimum, has been set. The present invention makes no requirement on the existence of an "<lib:SPProvidedNameIdentifier>" at this point in the processing. With step 304, the requirement is simply that the user has authenticated to the identity provider at some previous point in time and currently has a valid session with the identity provider. The present invention makes no requirement on the reasons for which this session was established; e.g., it is not a requirement that this session have been established for some purpose other than performing the register name identifier profile, nor that the session was created explicitly for the purposes of performing the register name identifier profile.

The enhanced HTTP-redirect-based register name identifier profile commences at the identity provider by sending an HTTP redirect message (HTTP Response message with status/reason code "302") to a client, also known as a user agent, such as a web browser application (step 306). This message may have been triggered by several different situations, such as the user explicitly requests to reset their identifier, or some administrator-based trigger has been set by the identity provider, or various other similar events. The redirect message redirects the client to the appropriate location, e.g., as identified by a URI within the "Location" header of the redirect message, of the Register Name Identifier service at the service provider. The "Location" HTTP header of the redirect message also includes a query component, e.g., appended to a URI and demarcated within the URI with a "?" character, that contains the "<lib:RegisterNameIdentifierRequest>" protocol message.

In response to receiving the redirect message from the identity provider, the client sends an HTTP Get message to the Register Name Identifier service at the service provider as indicated by the URI in the HTTP redirect message from the identity provider (step 308). In this manner, the client accesses the Register Name Identifier service at the service provider because the URI in the HTTP Get message still contains the attached "<lib:RegisterNameIdentifierRequest>" message.

In contrast with the process that is shown in FIG. 2A, the service provider performs an authentication operation with the user, the client, or the user agent (step 310); it may be assumed that the user/client has already been required to complete an authentication operation with the identity provider. If the authentication operation is not successfully completed at step 310, then the service provider can immediately return a failure response to the identity provider, thereby concluding the process.

At step 310, the user/client is required to complete an additional authentication operation, i.e. in addition to any authentication operation that may have been required by the identity provider, such that the service provider can ensure that the received Register Name Identifier Request is binding or trustworthy; otherwise, the service provider may not be sure that the received Register Name Identifier Request message has not originated from a malicious user/system, and the service provider cannot be sure that the client is performing an RNI request for the associated end-user. In general, it is not good practice to allow any random user to carry an RNI request for any other random user. With the present invention, the forcing of authentication or single-sign-on at both the identity provider and the service provider as part of the register name identifier profile helps to ensure that the secure binding of user to RNI request at both the identity provider and the service provider is maintained.

In any case, if a session already exists for the user at the service provider, then the service provider is not required to establish a new session; it may choose to rely on the pre-existing session. However, it should also be noted that, in a scenario in which a user may have multiple identity providers that are associated with a single service provider, the service provider may choose to re-establish a session for the user, thereby ensuring that the session within which the register name identifier profile is performed is bound explicitly to the identity provider that has initiated the register name identifier.

Assuming that the authentication operation is successfully completed at step 310, the service provider then processes the Register Name Identifier Request message (step 312), thereby registering the name identifier assigned by the identity provider to the principal. The service provider optionally terminates the user/client session that was created at the service provider (step 314).

After processing the Register Name Identifier Request message, the Register Name Identifier service at the service provider responds by sending an HTTP redirect message (HTTP Response message with status/reason code "302") to the client (step 316). The redirect message redirects the client to the identity provider using a return URI that was previously provided by the identity provider to the service provider. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message.

In response to receiving the redirect message from the service provider, the client sends an HTTP Get message to the identity provider as indicated by the URI in the HTTP redirect message from the service provider (step 318), thereby concluding the process. The client initiates the completion of the Register Name Identifier operation at the identity provider because the URI in the HTTP Get message from the client to the identity provider still contains the attached "<lib:RegisterNameIdentifierResponse>" message. Additional processing steps, which have not been shown in FIG. 3A, may be completed after the Register Name Identifier Response message is received by the identity provider.

Step 310 may comprise several different alternative implementations for authentication: (1) direct authentication by the service provider with the user; (2) a preliminary single-sign-on operation that is completed prior to sending the register name identifier request from the identity provider to the service provider; (3) a single-sign-on operation that is triggered by the service provider, i.e. sent from the service provider back to an identity provider for completion, thus implementing a pull-type single-sign-on operation; or (4) a single-sign-on operation that is based on the inclusion of single-sign-on information within the register name identifier request from the identity provider to the service provider, thus implementing a push-type single-sign-on operation. These alternatives are illustrated in FIGS. 3B-3E.

Figure 3B:
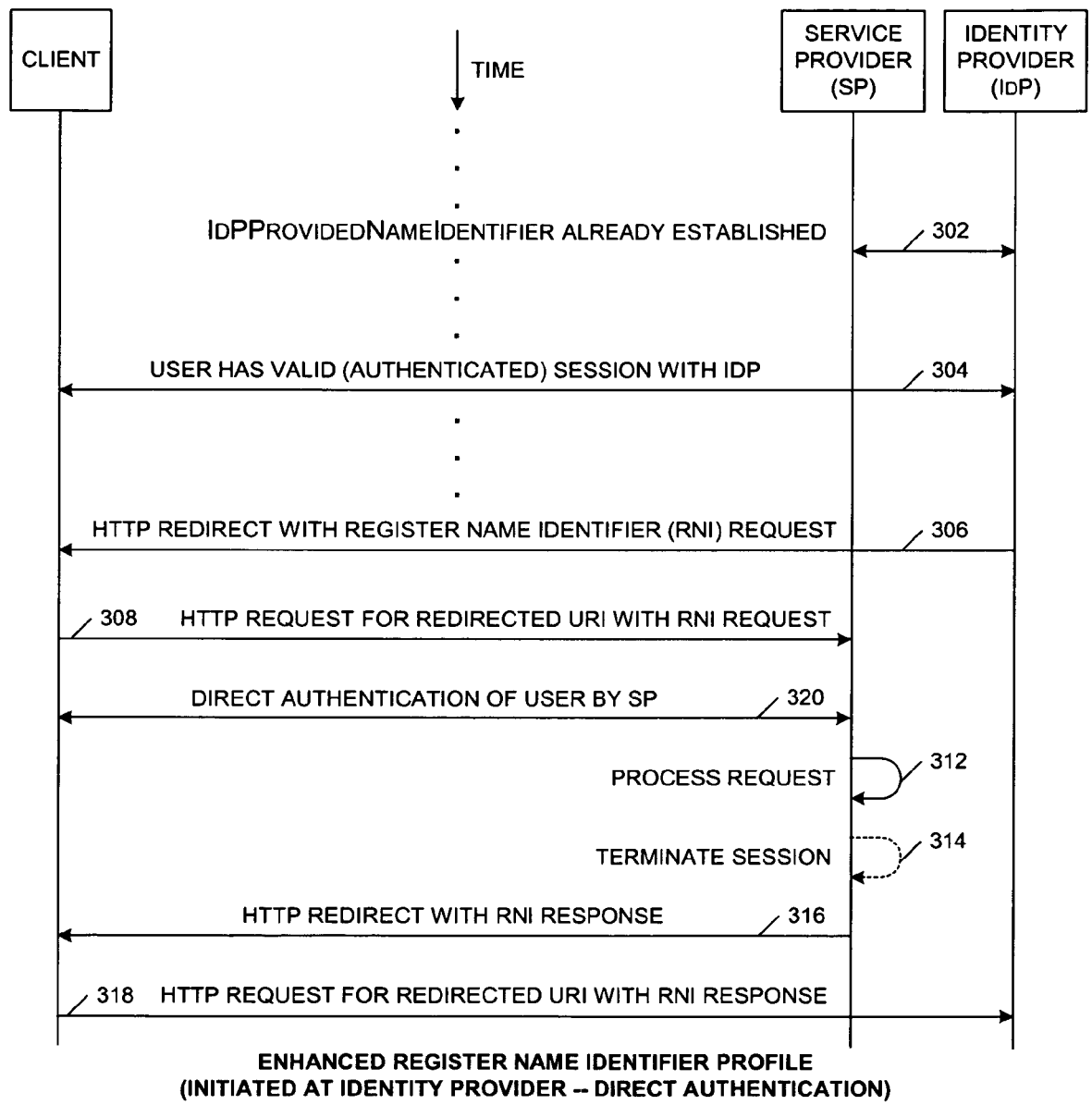
FIG. 3B depicts a dataflow diagram that illustrates an enhanced HTTP-redirect-based register name identifier (RNI) profile, including a direct authentication step, that is initiated by an identity provider in accordance with an embodiment of the present invention.

With reference now to FIG. 3B, a dataflow diagram depicts an enhanced HTTP-redirect-based register name identifier (RNI) profile, including a direct authentication step, that is initiated by an identity provider in accordance with an embodiment of the present invention. In a manner similar to that shown in FIG. 3A, FIG. 3B depicts a process by which an identity provider may change, i.e. register, a name identifier that has been assigned by the identity provider to a principal at the selected service provider; similar elements are identified by similar reference numerals. However, whereas FIG. 3A depicts a generalized authentication step 310, the process that is shown in FIG. 3B differs from the process that is shown in FIG. 3A by the inclusion of a direct authentication operation between the client, the user, or the user agent and the service provider (step 320).

Figure 3C:
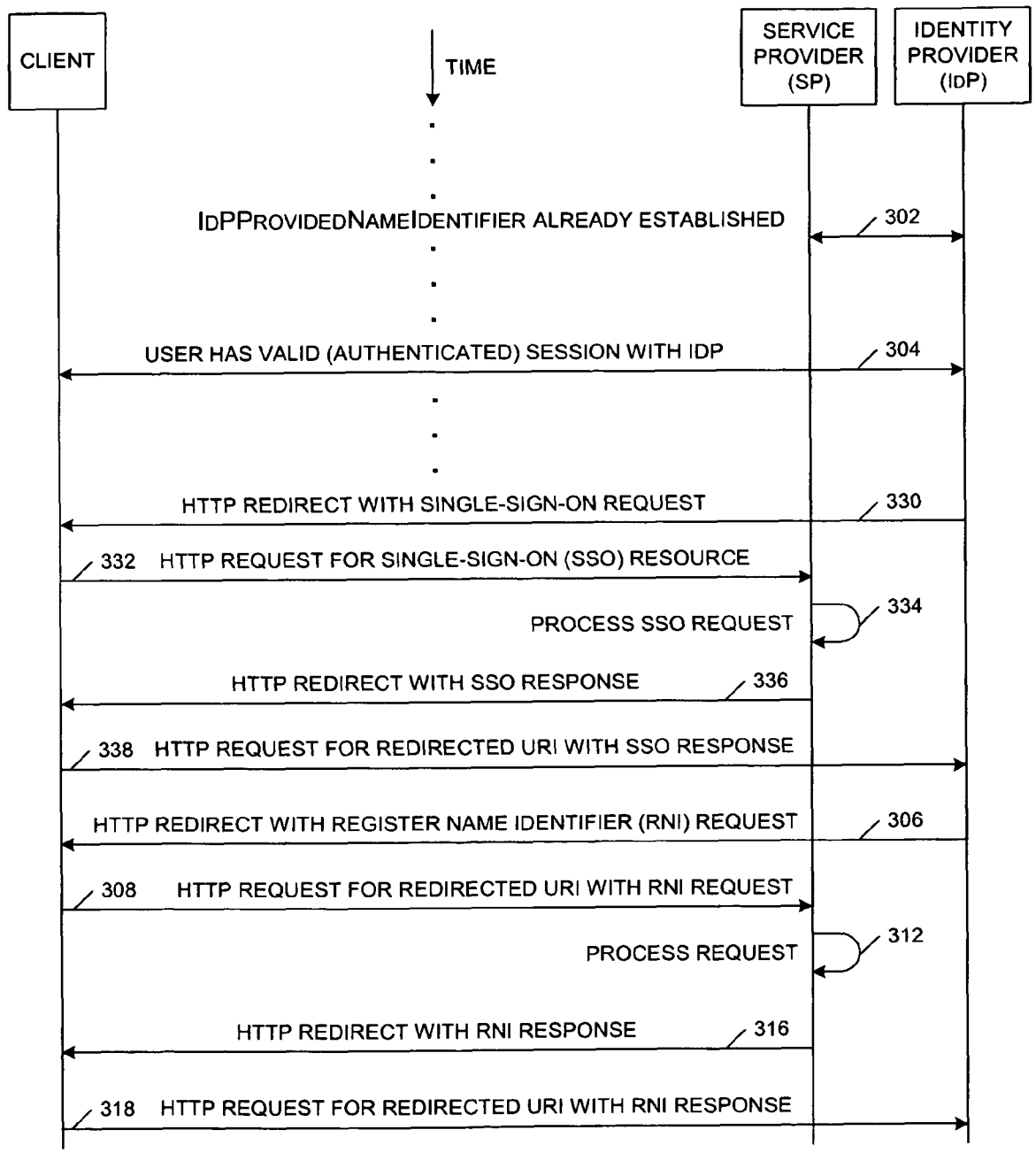
FIG. 3C depicts a dataflow diagram that illustrates an enhanced HTTP-redirect-based register name identifier (RNI) profile, including a preliminary single-sign-on operation for authentication, that is initiated by an identity provider in accordance with an embodiment of the present invention.

With reference now to FIG. 3C, a dataflow diagram depicts an enhanced HTTP-redirect-based register name identifier (RNI) profile, including a preliminary single-sign-on operation for authentication, that is initiated by an identity provider in accordance with an embodiment of the present invention. In a manner similar to that shown in FIG. 3A, FIG. 3C depicts a process by which an identity provider may change, i.e. register, a name identifier that has been assigned by the identity provider to a principal at the selected service provider; similar elements are identified by similar reference numerals. However, whereas FIG. 3A depicts a generalized authentication step 310, the process that is shown in FIG. 3C differs from the process that is shown in FIG. 3A by the inclusion of a specific authentication operation, as discussed hereinbelow.

The present invention does not preclude a direct authentication operation between the service provider and the user/client, whereby a service provider directly prompts a user/client for authentication credentials, such as the operation that is illustrated in FIG. 3B. However, step 310 in FIG. 3A is preferably implemented by a single sign-on operation to the service provider from the identity provider such that step 310 does not require user interaction; FIG. 3C depicts one embodiment that employs a single-sign-on operation, and FIGS. 3D-3E depicts other embodiments that employ a single-sign-on operation.

Referring to FIG. 3C, after the identity provider has determined to initiate a register name identifier profile with a particular service provider for the user, the identity provider first performs a single-sign-on operation with the service provider. The identity provider sends an HTTP redirect message (HTTP Response message with status/reason code "302") to the client, also known as a user agent, such as a web browser application (step 330). In response to receiving the redirect message from the identity provider, the client sends an HTTP Get message to the service provider as indicated by the URI in the HTTP redirect message from the identity provider (step 332). The service provider processes the single-sign-on request (step 334), e.g., by validating an authentication token from the identity provider. Assuming the single-sign-on operation is successfully completed, then the service provider responds by sending an HTTP redirect message (HTTP Response message with status/reason code "302") to the client (step 336). The redirect message redirects the client to the identity provider using a return URI that was previously provided by the identity provider to the service provider; the return URI is specified in the "Location" HTTP header of the redirect message. In response to receiving the redirect message from the service provider, the client sends an HTTP Get message to the identity provider as indicated by the URI in the HTTP redirect message from the service provider (step 338), thereby concluding the authentication/single-sign-on operation.

In the embodiment that is shown in FIG. 3C, when the RNI request is sent thereafter from the identity provider via the client to the service provider, the service provider will already have a valid session for the user because of the previous single-sign-on operation, and the service provider does not need to perform an authentication operation with the user in the manner that is shown in FIG. 3A.

Figure 3D:
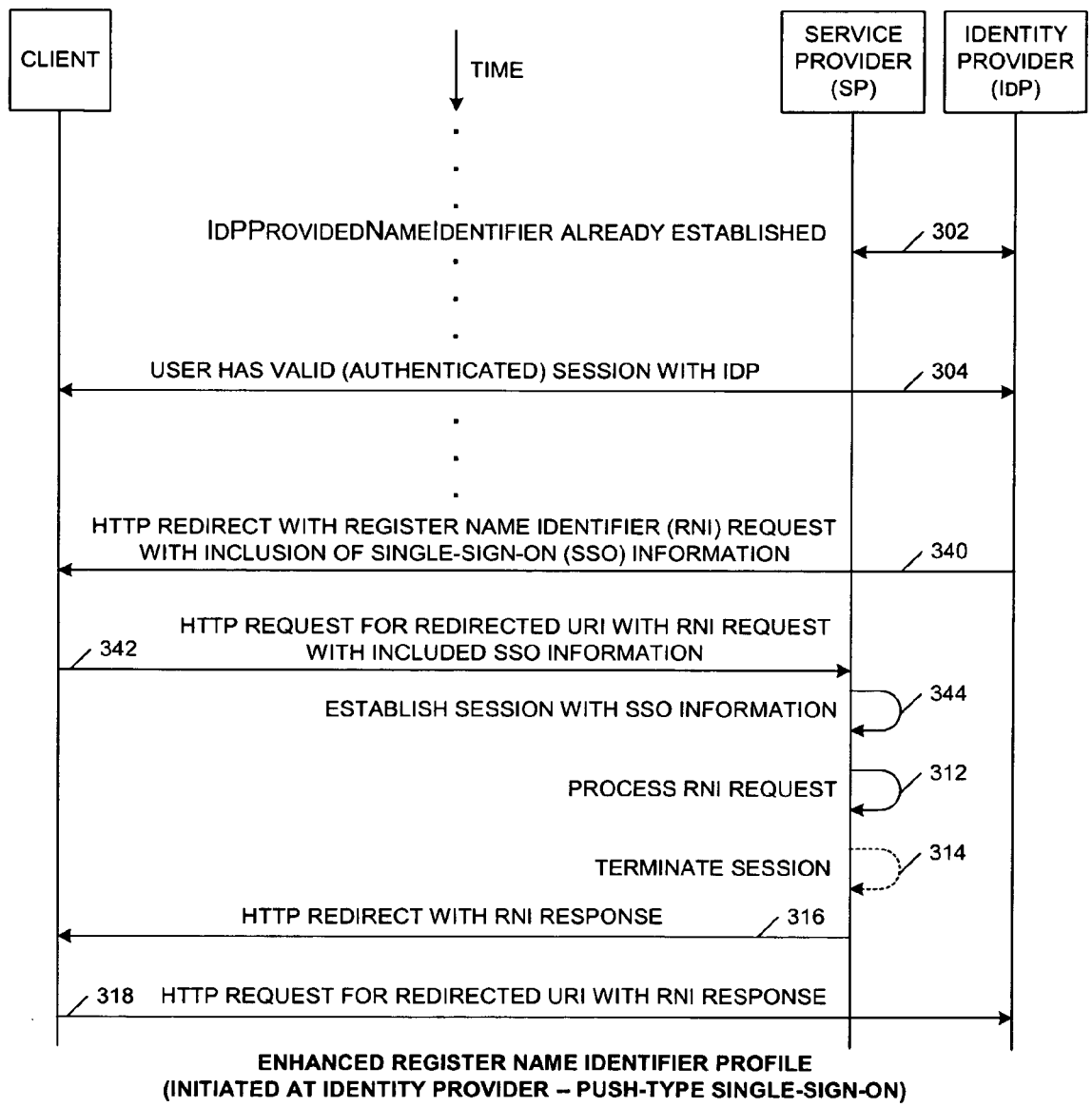
FIG. 3D depicts a dataflow diagram that illustrates an enhanced HTTP-redirect-based register name identifier (RNI) profile, including a push-type single-sign-on operation for authentication, that is initiated by an identity provider in accordance with an embodiment of the present invention.
Figure 3E:
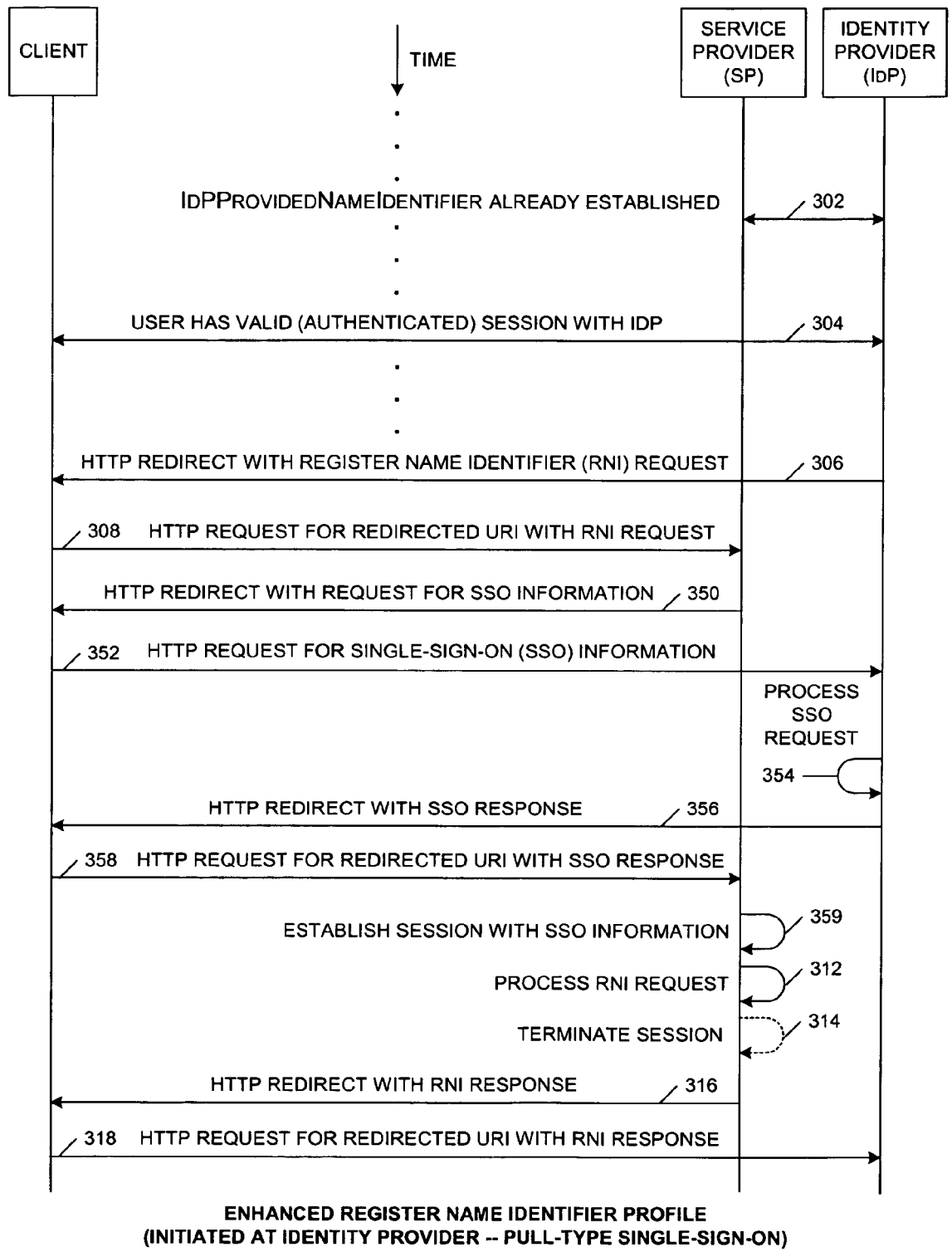
FIG. 3E depicts a dataflow diagram that illustrates an enhanced HTTP-redirect-based register name identifier (RNI) profile, including a pull-type single-sign-on operation for authentication, that is initiated by an identity provider in accordance with an embodiment of the present invention.

The present invention accommodates both a push-type single-sign-on operation, which is shown in FIG. 3D, and a pull-type single-sign-on operation, which is shown in FIG. 3E. With a push-type single-sign-on operation, the identity provider embeds some form of authentication token with the register name identifier request that is sent to the service provider; this allows the service provider to build a session for the user based on the information included with the register name identifier request if no session already exists. With a pull-type single-sign-on operation, the service provider interrupts the register name identifier processing to initiate a single-sign-on request to the identity provider. Once the pull-type single-sign-on operation is completed, the service provider is able to resume processing of the register name identifier request.

With reference now to FIG. 3D, a dataflow diagram depicts an enhanced HTTP-redirect-based register name identifier (RNI) profile, including a push-type single-sign-on operation for authentication, that is initiated by an identity provider in accordance with an embodiment of the present invention. In a manner similar to that shown in FIG. 3A, FIG. 3D depicts a process by which an identity provider may change, i.e. register, a name identifier that has been assigned by the identity provider to a principal at the selected service provider; similar elements are identified by similar reference numerals. However, whereas FIG. 3A depicts a generalized authentication step 310, the process that is shown in FIG. 3D differs from the process that is shown in FIG. 3A by the inclusion of a specific authentication operation, as discussed hereinbelow.

Referring to FIG. 3D, steps 340 and 342 in FIG. 3D are similar to steps 306 and 308 that are shown in FIG. 3A; however, steps 340 and 342 differ from steps 306 and 308 because the identity provider pushes single-sign-on information along with the RNI request in the HTTP redirect message to the client (step 340). In response to receiving the redirect message from the identity provider, the client sends an HTTP Get message to the Register Name Identifier service at the service provider as indicated by the URI in the HTTP redirect message from the identity provider (step 342); the message from the client to the service provider also contains the single-sign-on information. When the service provider processes the request, assuming that the single-sign-on request can be validated, the service provider establishes a session for the user based on the single-sign-on information (step 344) prior to processing the RNI request at step 312.

With reference now to FIG. 3E, a dataflow diagram depicts an enhanced HTTP-redirect-based register name identifier (RNI) profile, including a pull-type single-sign-on operation for authentication, that is initiated by an identity provider in accordance with an embodiment of the present invention. In a manner similar to that shown in FIG. 3A, FIG. 3E depicts a process by which an identity provider may change, i.e. register, a name identifier that has been assigned by the identity provider to a principal at the selected service provider; similar elements are identified by similar reference numerals. However, whereas FIG. 3A depicts a generalized authentication step 310, the process that is shown in FIG. 3E differs from the process that is shown in FIG. 3A by the inclusion of a specific authentication operation, as discussed hereinbelow.

Referring to FIG. 3E, after the service provider has received the request for the register name identifier profile for the user from a particular identity provider at step 308, the service provider suspends the processing of the RNI request in order to perform a pull-type single-sign-on operation with the identity provider. The service provider sends an HTTP redirect message (HTTP Response message with status/reason code "302") to the client (step 350). In response to receiving the redirect message from the service provider, the client sends an HTTP Get message to the identity provider as indicated by the URI in the HTTP redirect message from the service provider (step 352).

The identity provider processes the request to obtain the single-sign-on information (step 354), e.g., by generating an authentication token for the service provider. The identity provider responds by sending an HTTP redirect message (HTTP Response message with status/reason code "302") to the client (step 356), wherein the redirect message contains the requested single-sign-on information. The redirect message redirects the client to the service provider using a return URI that was previously provided by the service provider to the identity provider; the return URI is specified in the "Location" HTTP header of the redirect message. In response to receiving the redirect message from the service provider, the client sends an HTTP Get message to the service provider as indicated by the URI in the HTTP redirect message from the identity provider (step 358). When the service provider processes the request, assuming that the single-sign-on information can be validated, the service provider establishes a session for the user based on the single-sign-on information (step 359) prior to resuming the processing of the RNI request at step 312. In this manner, the service provider interrupts the register name identifier processing to initiate a pull-type single-sign-on request to the identity provider. Once the pull-type single-sign-on operation is completed, the service provider is able to resume processing of the register name identifier request.

Figure 3F:
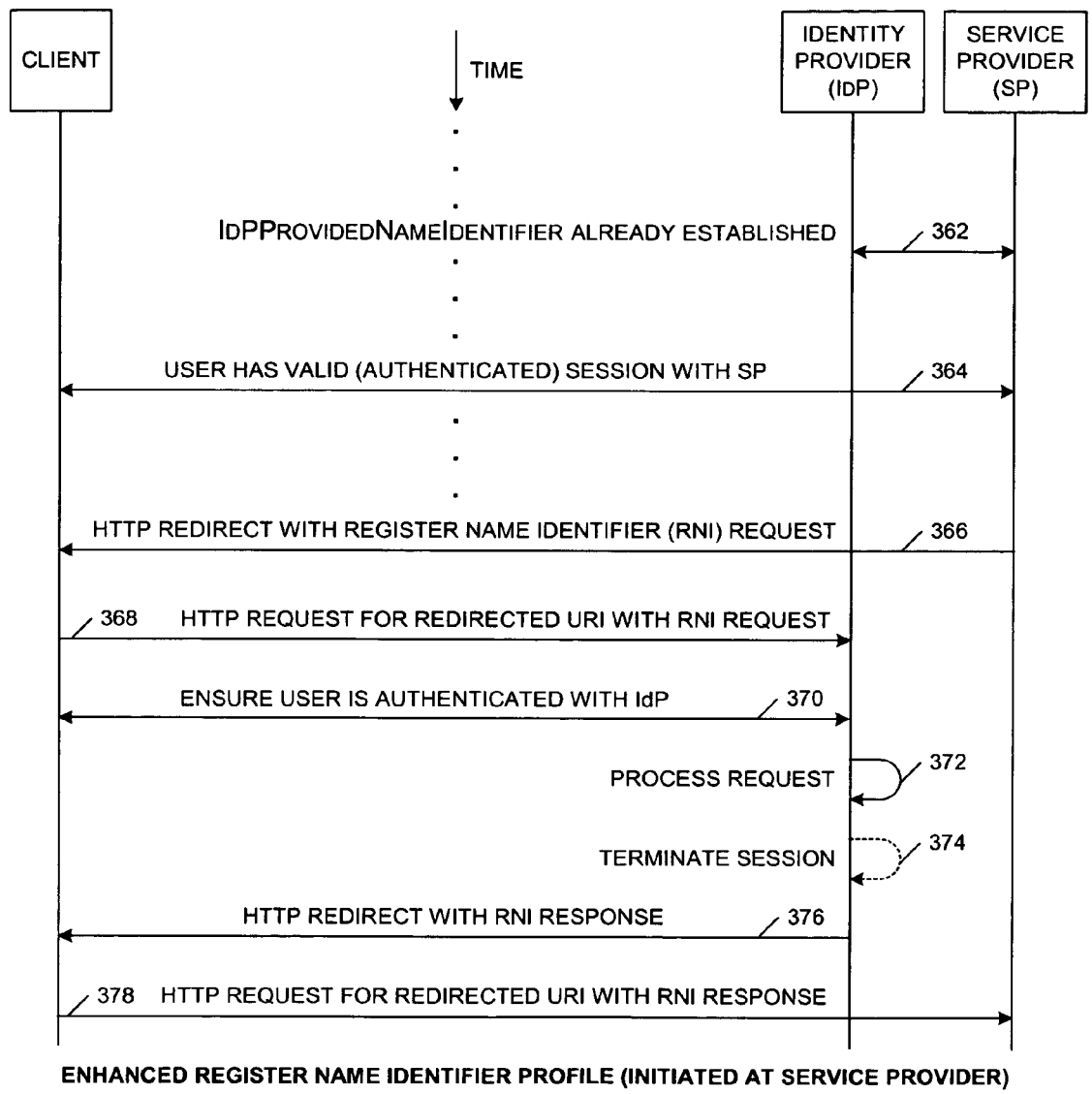
FIG. 3F depicts a dataflow diagram that illustrates an enhanced HTTP-redirect-based register name identifier (RNI) profile, including a generalized authentication step, that is initiated by a service provider in accordance with an embodiment of the present invention.

With reference now to FIG. 3F, a dataflow diagram depicts an enhanced HTTP-redirect-based register name identifier profile, including a generalized authentication step, that is initiated by a service provider in accordance with an embodiment of the present invention. In a manner similar to that shown in FIG. 2B, FIG. 3F depicts a process by which a service provider may set, or change, i.e. register, the name identifier that has been provided by the service provider to a principal, known as "<lib:SPProvidedNameIdentifier>", which may occur for a variety of implementation-specific reasons. However, the process that is shown in FIG. 3F differs from the process that is shown in FIG. 2B by the inclusion of an additional authentication step, as discussed hereinbelow.

The prerequisites for this dataflow are that the user has already linked the user's accounts at the identity provider and the service provider (step 362) and that the user has already authenticated to the service provider (step 364). With step 362, the requirement is simply that an "<lib:IdPProvidedNameIdentifier>", at a minimum, has been set. The present invention makes no requirement on the existence of an "<lib:SPProvidedNameIdentifier>" at this point in the processing. With step 364, the requirement is simply that the user has authenticated to the service provider at some previous point in time and currently has a valid session with the service provider. The present invention makes no requirement on the reasons for which this session was established. For example, the present invention does not have a requirement that this session have been established for some purpose other than performing the register name identifier profile nor that the session was created explicitly for the purposes of performing the register name identifier profile. In addition, the present invention does not have a requirement as to how the session was created at the service provider; e.g., it is not a requirement nor a restriction that this session was created based on a single-sign-on operation from the corresponding identity provider nor that the session was created through a direct authentication operation by the service provider.

The enhanced HTTP-redirect-based register name identifier profile commences at the service provider by sending an HTTP redirect message (HTTP Response message with status/reason code "302") to a client (step 366). The redirect message redirects the client to the appropriate location, e.g., as identified by a URI within the "Location" header of the redirect message, of the Register Name Identifier service at the identity provider. The "Location" HTTP header of the redirect message also includes a query component, e.g., appended to a URI and demarcated within the URI with a "?" character, that contains the "<lib:RegisterNameIdentifierRequest>" protocol message.

In response to receiving the redirect message from the service provider, the client sends an HTTP Get message to the Register Name Identifier service at the identity provider as indicated by the URI in the HTTP redirect message from the service provider (step 368). In this manner, the client accesses the Register Name Identifier service at the identity provider because the URI in the HTTP Get message still contains the attached "<lib:RegisterNameIdentifierRequest>" message.

In contrast with the process that is shown in FIG. 2B, if the identity provider does not have a valid session with the user, the identity provider performs an authentication operation with the user, the client, or the user agent (step 370); it may be assumed that the user/client has already been required to complete an authentication operation with the service provider. The identity provider may not have a valid session for the user for a variety of reasons: (1) a previous session may have already terminated; the user may have performed an authentication operation directly with the service provider without any previous interaction with the identity provider; or (3) the user has performed a single-signed-on operation to the service provider through a different identity provider; or for some other reason. If the authentication operation is not successfully completed at step 370, then the identity provider can immediately return a failure response to the service provider, thereby concluding the process.

At step 370, the user/client is required to complete an additional authentication operation, i.e. in addition to any authentication operation that may have been required by the service provider, such that the identity provider can ensure that the received Register Name Identifier Request is binding or trustworthy; otherwise, the identity provider may not be sure that the received Register Name Identifier Request message has not originated from a malicious user/system, and the identity provider cannot be sure that the client is performing an RNI request for the associated end-user. In general, it is not good practice to allow any random user to carry an RNI request for any other random user. With the present invention, the forcing of authentication or single-sign-on at both the identity provider and the service provider as part of the register name identifier profile helps to ensure that the secure binding of user to RNI request at both the identity provider and the service provider is maintained.

Assuming that the authentication operation is successfully completed at step 370, the identity provider then processes the Register Name Identifier Request message (step 372), thereby registering the name identifier provided by the service provider to the principal. The identity provider optionally terminates the user/client session that was created at the identity provider (step 374), preferably only if this session was created solely for performing the register name identifier profile. It should be noted that, in general, the identity provider will not terminate this session, especially if the session pre-existed before the register name identifier profile was initiated.

After processing the Register Name Identifier Request message, the Register Name Identifier service at the identity provider responds by sending an HTTP redirect message (HTTP Response message with status/reason code "302") to the client (step 376). The redirect message redirects the client to the service provider using a return URI that was previously provided by the service provider to the identity provider. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message.

In response to receiving the redirect message from the identity provider, the client sends an HTTP Get message to the service provider as indicated by the URI in the HTTP redirect message from the identity provider (step 378), thereby concluding the process. The client initiates the completion of the Register Name Identifier operation at the service provider because the URI in the HTTP Get message from the client to the service provider still contains the attached "<lib:RegisterNameIdentifierResponse>" message. Additional processing steps, which have not been shown in FIG. 3F, may be completed after the Register Name Identifier Response message is received by the service provider.

Enhanced Register Name. Identifier Profile for Federation

As discussed above with respect to FIG. 2A and FIG. 2B, the register name identifier profiles are those profiles by which a service provider may request the registration of a name identifier for a principal, or by which an identity provider or a service provider may change a name identifier for a principal in accordance with the prior art Liberty Alliance specifications. As mentioned above, the register name identifier profiles, as described in the prior art Liberty Alliance specifications, do not allow an identity provider to trigger the initial setting of a name identifier; in other words, the register name identifier profiles can not be used to link previously unlinked accounts, also known as an operation to federate accounts. These profiles may only be invoked within a pre-existing account-linked scenario, i.e. a federated scenario. The initial account-linking process can only be invoked by a service provider within the scope of a specialized single-sign-on profile, often referred to as a federation profile.

The present invention addresses this inadequacy by allowing an identity provider to trigger the register name identifier profile for the purpose of establishing the initial account linking. This approach requires a user, presumably the principal for which the register name identifier profile is being performed, to explicitly authenticate to both the identity provider and the service provider during the initial register name identifier operation, as illustrated in more detail hereinbelow with respect to FIG. 4A and FIG. 4B. Although the exemplary embodiments that are illustrated within FIG. 4A and FIG. 4B employ HTTP-based communications, the present invention is not limited to HTTP-based communications, and other communication protocols may be employed.

Figure 4A:
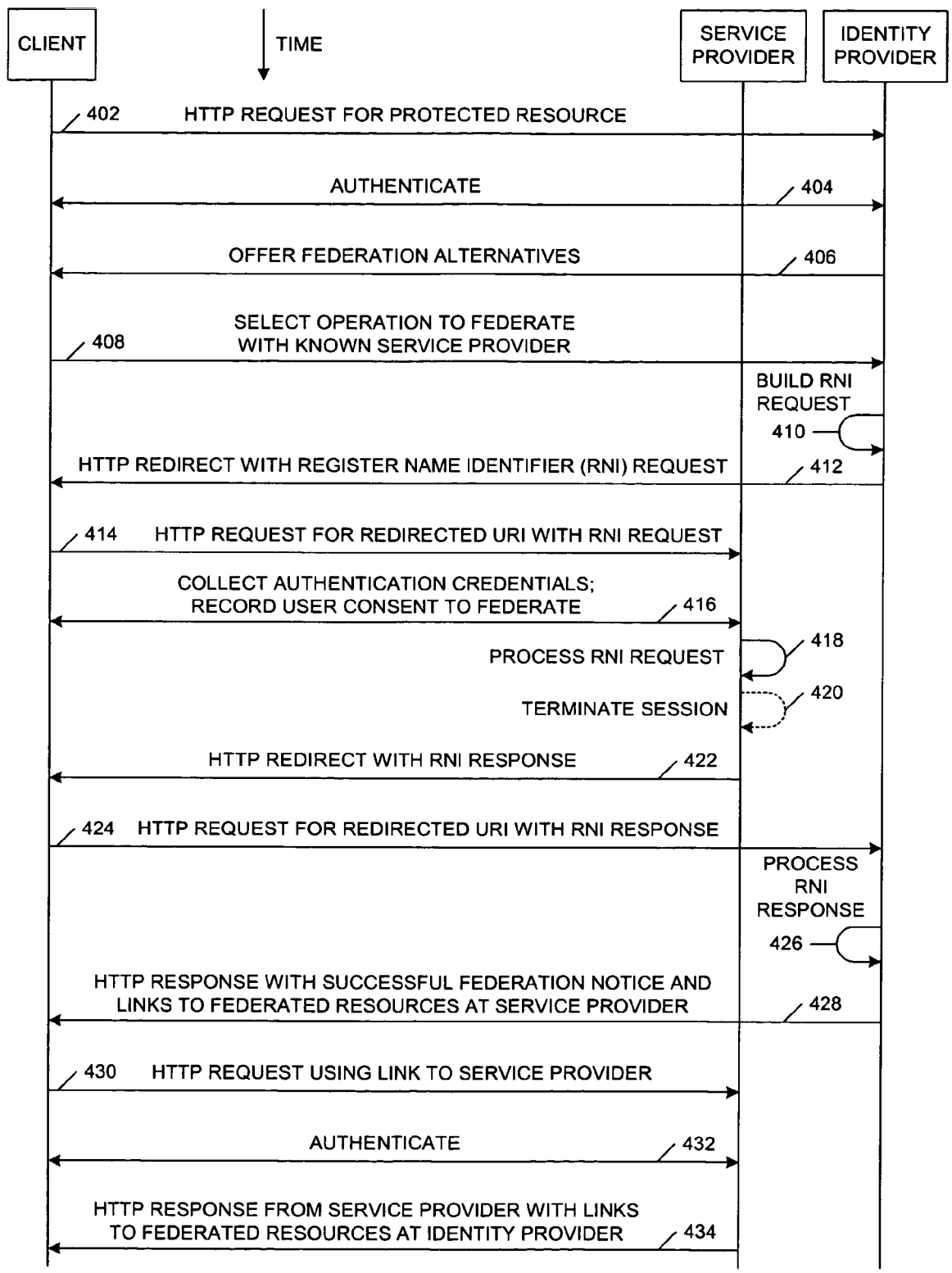
FIG. 4A depicts a dataflow diagram that illustrates an enhanced HTTP-redirect-based register name identifier profile that is initiated by an identity provider in order to perform an account-linking operation, optionally followed by a single-sign-on operation, in accordance with an embodiment of the present invention.

With reference now to FIG. 4A, a dataflow diagram depicts an enhanced HTTP-redirect-based register name identifier profile that is initiated by an identity provider in order to perform an account-linking operation, optionally followed by a single-sign-on operation in accordance with an embodiment of the present invention. In a manner similar to that shown in FIG. 3A, FIG. 4A depicts a process by which an identity provider may register a new name identifier for a principal where no name identifier currently exists at the identity provider for the principal with a given service provider; this functionality is not specified in the prior art Liberty Alliance specifications. In addition, FIG. 4A depicts additional processing steps that illustrate an example in which the enhanced HTTP-redirect-based register name identifier profile of the present invention is incorporated into a set of transactions in which a user account at an identity provider and a user account at a service provider are linked together. After the account-linking operation has been performed, the identity provider may initiate a single-sign-on operation with the service provider that relies on the linked accounts.

The process commences with a client sending an HTTP Request message for a protected or controlled resource at an identity provider (step 402), e.g., such as a login web page. The identity provider subsequently requires the client to complete an authentication operation (step 404), after which the identity provider returns a response to the client (step 406). In this example, the identity provider returns an offer of federation alternatives; these federation alternatives may be a list of service providers that interoperate with the identity provider within the same federation.

For example, the identity provider may return a web page that contains a list of third-party portals that interact with the identity provider within a federated computing environment; the returned web page represents a form that allows the user to select a third-party portal from the list of third-party portals. The user of the client, who is a principal within the federation, may or may not have previously established a user account at one of the third-party portals; however, assuming that the user has established a user account at one of the third-party portals, the returned web page is a form that allows the user to link the user's account at the third-party portal with the user's account at the identity provider. In other words, the web page that is received by the client from the identity provider allows the user to initiate an account-linking operation such that the third-party portal is subsequently linked to the identity provider with respect to the user. The user of the client may select a third-party portal, e.g., by selecting a check box in a web page that is formatted as a form and that is presented to the user within a window of a web browser, wherein the check box is associated with a particular third-party portal that represents a domain that is operated by a service provider. Upon selection of a particular control, such as an "OK" button or a "Submit" button, the appropriate content from the form is sent from the client to the identity provider, e.g., within an HTTP Post message, thereby indicating that the user desires to federate the user's account at the identity provider with the selected service provider (step 408).

After receiving the request from the client to initiate the federation operation, the identity provider builds a Register Name Identifier Request message (step 410). The enhanced HTTP-redirect-based register name identifier profile of the present invention then commences at the identity provider by sending an HTTP redirect message (HTTP Response message with status/reason code "302") to the client (step 412). The redirect message redirects the client to the appropriate location, e.g., as identified by a URI within the "Location" header of the redirect message, of the Register Name Identifier service at the service provider. The "Location" HTTP header of the redirect message also includes a query component, e.g., appended to a URI and demarcated within the URI with a "?" character, that contains the "<lib:RegisterNameIdentifierRequest>" protocol message that was previously built at step 410.

In response to receiving the redirect message from the identity provider, the client sends an HTTP Get message to the Register Name Identifier service at the service provider as indicated by the URI in the HTTP redirect message from the identity provider (step 414). If the user does not already have a valid session with the service provider, the service provider collects the user's authentication credentials (e.g., username and password) and validates these credentials (step 416), thereby requiring an additional user interaction, i.e. in addition to any interaction that may have been required by the identity provider. This interaction is required such that the service provider can determine the local identity of the user for whom the federation/register name identifier is requested.

The service provider is not required to establish a session for the user in response to this authentication request; the service provider may simply validate the presented credentials in order to determine the user's identity and authenticity. Hence, the service provider is not required to manage a session for the user in order to complete this register name identifier profile as the service-provider-side functionality is completed within the scope of a single HTTP request/response pair.

It should be noted that, in some cases, the user will have already established an account at the service provider. However, if the user does not have a pre-existing account at the service provider, the service provider may choose to create an account for the user in response to this authentication/RNI request; once this account is established, the remainder of the RNI processing would proceed as shown in FIG. 4A, i.e. to federate the user's account at the service provider with the user's account at the identity provider.

Part of step 416 may also include a service provider interaction with the user whereby the service provider may choose to notify the user of the request to federate, e.g., by providing a specially formatted web page containing a message such as:

> You are attempting to federate/link your account with us with the identity provider "X". By providing us with your login information, you consent to this linking. Once this link has been established, you will be able to perform a single-sign-on operation to your local account from identity provider "x". If you do not wish to complete this action, select "CANCEL".

A cancel request from the user immediately generates a failure response to the identity provider. This page may be presented as part of a login request from the service provider, thereby explaining to the user why the user's authentication credentials are being requested.

If an explicit user interaction for collecting authentication credentials is not required because the user has a pre-existing valid session with the service provider, then step 416 may be used by the service provider to ask for the user's "consent to federate", which is an action that is defined only within the SSO-federate profile of the prior art Liberty Alliance specifications. It should be noted that this scenario (i.e. in which accounts have not yet been linked; the user has authenticated to an identity provider and has optionally authenticated to the service provider; and the user requests account linkage from the identity provider) is not possible with the prior art Liberty Alliance specification for a register name identifier profile.

It should also be noted that because the user's service provider account and the user's identity provider account have not yet been federated, a single-sign-on operation from the identity provider to the service provider is not possible; the user must present authentication credentials/identity information directly to the service provider. It is possible that the user has already federated the user's account at the service provider with a different identity provider, in which case a single-sign-on operation from this other identity provider is possible. Hence, alternatively, the user may be presented with some option of declining the new federation between the service provider and the requesting identity provider, e.g., in deference to the pre-existing federation of the user's account at the service provider with a different identity provider.

If the Register Name Identifier Request message is received at the service provider in the context of a session that has been established through a single-sign-on operation from a different identity provider, then the service provider may choose to re-prompt the user for authentication credentials before proceeding with the register name identifier processing. An example of a scenario in which this is desirable is as follows: a user has two distinct accounts with a service provider, one that is linked to the user's employer as their identity provider and one that is the user's personal account and is not linked with their employer. If the user then wishes to link this second, personal account with a different identity provider, for example, the user's bank, then the service provider must take care to ensure that any Register Name Identifier Request message that is received from the bank is correctly linked with the user's personal account. Thus, if the user attempts to federate his bank and personal accounts while he has a valid session with the service provider from his employer, the onus is on the service provider to ensure that the appropriate account linking is accomplished.

If the user is attempts to federate an account that is already federated with a different identity provider, the user should be prompted, e.g., by providing a specially formatted web page containing a message such as:

You are currently federated with Identity Provider "X"—
do you wish to federate now with Identity Provider "Y"?

It is possible for a user to have multiple identity providers that are associated with a single service provider. Although this is not a common occurrence, this may occur, for example, when a user has an account with a service provider that is sponsored by, or is affiliated in some manner with, the user's employer acting as their identity provider; the user may not even realize that the service provider resources are not provided by the identity provider. The user may also have a personal account with the same service provider; for example, a service provider may offer stock option management through the user's employer in addition to personal trading services through the user's personal account.

Assuming that the authentication/identification operation is successfully completed at step 416, the service provider then processes the Register Name Identifier Request message (step 418), thereby registering the name identifier assigned by the identity provider to the principal and linking the identities of the principal such that the user's accounts are linked together through the information that is held by the identity provider. The service provider optionally terminates any user/client session that may have been created at the service provider (step 420).

After processing the Register Name Identifier Request message, the Register Name Identifier service at the service provider responds by sending an HTTP redirect message (HTTP Response message with status/reason code "302") to the client (step 422). This message may also include some form of client-side-maintained information (such as an HTTP cookie) that is set by the service provider and identifies the identity provider as the user's identity provider; this will immediately enable the user to perform a single-sign-on operation to the service provider from the identity provider.

The redirect message redirects the client to the identity provider using a return URI that was previously provided by the identity provider to the service provider. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message.

In response to receiving the redirect message from the service provider, the client sends an HTTP Get message to the identity provider as indicated by the URI in the HTTP redirect message from the service provider (step 424). The client initiates the completion of the Register Name Identifier operation at the identity provider because the URI in the HTTP Get message from the client to the identity provider still contains the attached "<lib:RegisterNameIdentifierResponse>" message. The identity provider processes the Register Name Identifier Response message from the service provider that was redirected through the client (step 426).

Assuming that the response from the service provider indicates a successful Register Name Identifier operation, the identity provider sends a response to the client for the federation operation that was originally requested at step 408 (step 428); this response may contain an indication of the successful completion of the account-linking operation along with links to federated resources at the service provider, e.g., in the form of hyperlinks that are embedded within a web page that is returned to a web browser that is executing on the client.

The user may then operate the web browser at the client to select or to access a controlled or protected resource at the service provider as provided within the web page that has been received from the identity provider, and the client sends an HTTP Request message to the service provider for the requested resource (step 430). Given that the user's accounts at the identity provider and the service provider are now linked together, the service provider may interact with the client and/or the identity provider to perform an authentication operation (step 432); for example, the identity provider may provide an authentication token as requested by the service provider through HTTP redirection messages via the client. Assuming that the authentication operation is successful, the service provider sends an HTTP Response message to the client (step 434). The response from the service provider to the client may be a web page that represents the third-party portal services that are specifically available to the user based on the user's identity; in other words, the web page preferably contains information content that is specifically tailored for the user. In addition, the web page may include links to protected or controlled resources at the identity provider in a federated manner.

As noted above, step 420 is optional but preferably included within the Register Name Identifier profile of the present invention should a session have been created; if a session for the Register Name Identifier operation was created and not terminated at step 420, then undefined results may be generated by the service provider at step 430 for the following reason. During the subsequent request from the client to the service provider at step 430, the service provider may recognize that the request has originated from the same client, e.g., because of an HTTP cookie that accompanies the request from the client, wherein the HTTP cookie contains a session identifier, wherein this session is bound to the user as directly authenticated to the service provider. If the previous session was not terminated, then the service provider might recognize the session identifier within the HTTP cookie as a valid session identifier, thereby causing the service provider to respond to the client using the information that is associated with the previously constructed session; however, this information is stale. If the previously established session includes a copy of a subset of the user's account information, then the service provider returns a response based upon this subset of information from the user's account, yet the user's account at the service provider became federated with the user's account at the identity provider after the previously established session was built. Thus, the service provider should respond to the subsequent request from the client using information in the user's account at the service provider as established after the service provider performed the Register Name Identifier operation for the user such that the user receives a response that may have federation information; one way to ensure that the most recent user account information is utilized is to ensure that the previous session is terminated at step 420, or that a session is never established in step 420.

For example, the service provider may offer purchase incentives for certain services within an e-commerce domain for users that have accounts that are federated with the identity provider. If the service provider were to use stale user account information, then the user would not receive such incentives until the user's next session at the service provider, i.e. a subsequent visit by the user to the e-commerce domain that is operated by the service provider. However, the incentives should be available to the user as soon as possible after the user's accounts have been linked together. By terminating the earlier session, this scenario is avoided.

Figure 4B:
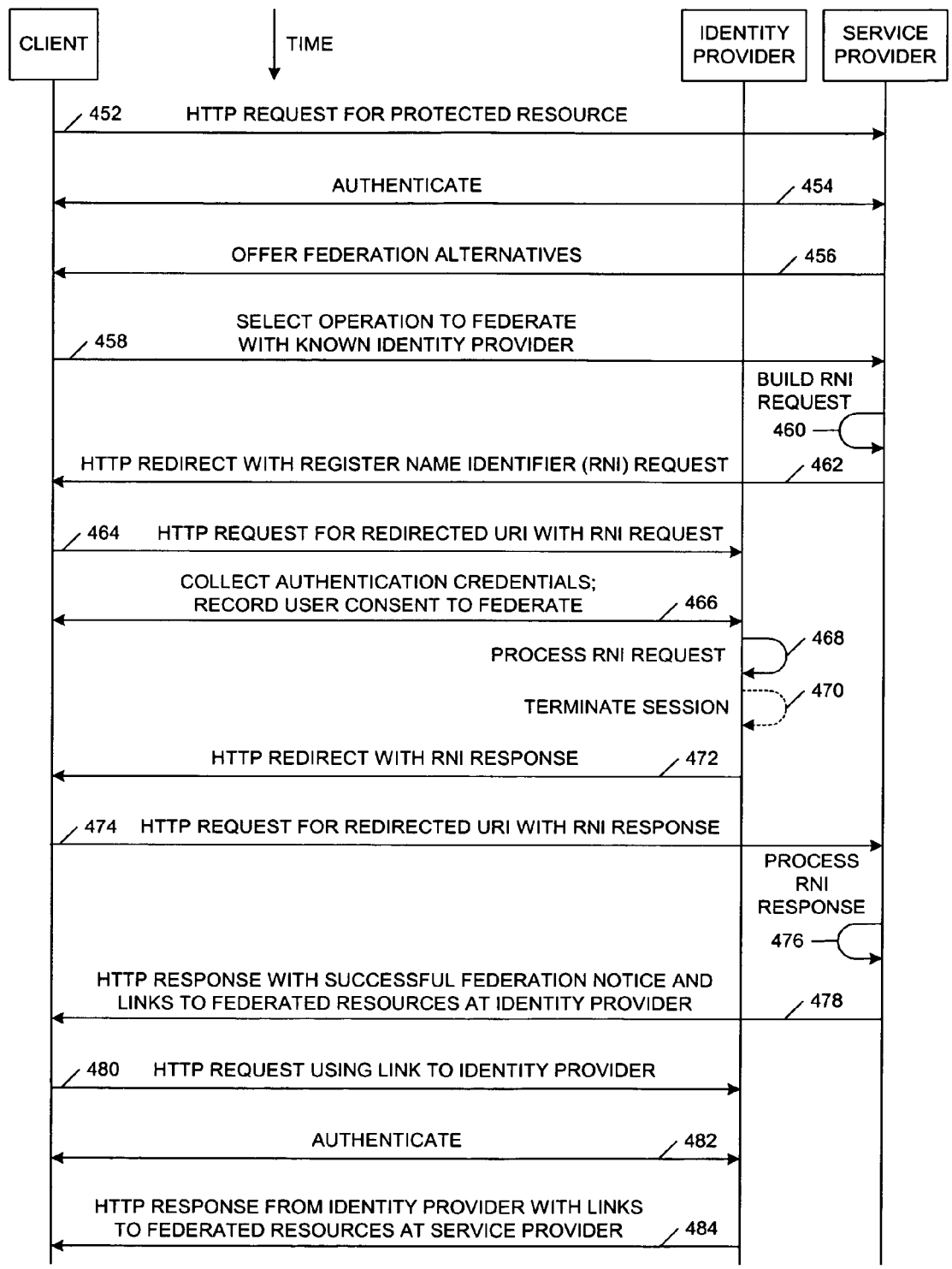
FIG. 4B depicts a dataflow diagram that illustrates an enhanced HTTP-redirect-based register name identifier profile that is initiated by a service provider in order to perform an account-linking operation, optionally followed by a single-sign-on operation, in accordance with an embodiment of the present invention.

With reference now to FIG. 4B, a dataflow diagram depicts an enhanced HTTP-redirect-based register name identifier profile that is initiated by a service provider in order to perform an account-linking operation, optionally followed by a single-sign-on operation in accordance with an embodiment of the present invention. In a manner similar to that shown in FIG. 3B, FIG. 4B depicts a process by which a service provider may register a new name identifier for a principal where no name identifier currently exists at the identity provider for the principal with a given service provider; this functionality is not specified in the prior art Liberty Alliance specifications. In addition, FIG. 4A depicts additional processing steps that illustrate an example in which the enhanced HTTP-redirect-based register name identifier profile of the present invention is incorporated into a set of transactions in which a user account at an identity provider and a user account at a service provider are linked together. After the account-linking operation has been performed, the identity provider may initiate a single-sign-on operation with the service provider that relies on the linked accounts.

The process commences with a client sending an HTTP Request message for a protected or controlled resource at a service provider (step 452), e.g., such as a login web page. The service provider subsequently requires the client to complete an authentication operation (step 454), after which the service provider returns a response to the client (step 456). In this example, the service provider returns an offer of federation alternatives; these federation alternatives may be a list of identity providers that interoperate with the service provider within the same federation.

For example, the service provider may return a web page that contains a list of third-party portals that interact with the service provider within a federated computing environment; the returned web page represents a form that allows the user to select a third-party portal from the list of third-party portals. The user of the client, who is a principal within the federation, may or may not have previously established a user account at one of the third-party portals; however, assuming that the user has established a user account at one of the third-party portals, the returned web page is a form that allows the user to link the user's account at the third-party portal with the user's account at the identity provider. In other words, the web page that is received by the client from the service provider allows the user to initiate an account-linking operation such that the third-party portal is subsequently linked to the service provider with respect to the user. The user of the client may select a third-party portal, e.g., by selecting a check box in a web page that is formatted as a form and that is presented to the user within a window of a web browser, wherein the check box is associated with a particular third-party portal that represents a domain that is operated by an identity provider. Upon selection of a particular control, such as an "OK" button or a "Submit" button, the appropriate content from the form is sent from the client to the service provider, e.g., within an HTTP Post message, thereby indicating that the user desires to federate the user's account at the service provider with the selected identity provider (step 458).

After receiving the request from the client to initiate the federation operation, the service provider builds a Register Name Identifier Request message (step 460). The enhanced HTTP-redirect-based register name identifier profile of the present invention then commences at the service provider by sending an HTTP redirect message (HTTP Response message with status/reason code "302") to the client (step 462). The redirect message redirects the client to the appropriate location, e.g., as identified by a URI within the "Location" header of the redirect message, of the Register Name Identifier service at the identity provider. The "Location" HTTP header of the redirect message also includes a query component, e.g., appended to a URI and demarcated within the URI with a "?" character, that contains the "<lib:RegisterNameIdentifierRequest>" protocol message that was previously built at step 460.

In response to receiving the redirect message from the service provider, the client sends an HTTP Get message to the Register Name Identifier service at the identity provider as indicated by the URI in the HTTP redirect message from the service provider (step 464). If the user does not already have a valid session with the identity provider, the identity provider collects the user's authentication credentials (e.g., username and password) and validates these credentials (step 466), thereby requiring an additional user interaction, i.e. in addition to any interaction that may have been required by the service provider. This interaction is required such that the identity provider can determine the local identity of the user for whom the federation/register name identifier is requested. The identity provider is not required to establish a session for the user in response to this authentication request; however, the identity provider should create a session for the user because a response will be sent to the service provider that may be used by the service provider for single-sign-on purposes.

It should be noted that, in some cases, the user will have already established an account at the identity provider. However, if the user does not have a pre-existing account at the identity provider, the identity provider may choose to create an account for the user in response to this authentication/RNI request; once this account is established, the remainder of the RNI processing would proceed as shown in FIG. 4B, i.e. to federate the user's account at the identity provider with the user's account at the service provider.

Part of step 466 may also include an identity provider interaction with the user whereby the identity provider may choose to notify the user of the request to federate, e.g., by providing a specially formatted web page containing a message such as:

> You are attempting to federate/link your account with us with the service provider "X". By providing us with your login information, you consent to this linking. Once this link has been established, you will be able to perform a single-sign-on operation to your local account from service provider "X". If you do not wish to complete this action, select "CANCEL".

A cancel request from the user immediately generates a failure response to the service provider. This page may be presented as part of a login request from the identity provider, thereby explaining to the user why the user's authentication credentials are being requested.

If an explicit user interaction for collecting authentication credentials is not required because the user has a pre-existing valid session with the identity provider, step 466 may be used by the identity provider to ask for the user's "consent to federate". It should be noted that this scenario (i.e. in which accounts have not yet been linked; the user has authenticated to a service provider and has optionally authenticated to the identity provider; and the user requests account linkage from identity provider) is not possible with the prior art Liberty Alliance specification for a register name identifier profile.

It should be noted that it is possible that the user has already federated the user's account at the identity provider with other service providers; however, this should not affect the user's request to federate (another) service provider account with this identity provider. In this case, it is desirable to present the user with some option of declining the federation with this service provider.

Assuming that the authentication/identification operation is successfully completed at step 466, the identity provider then processes the Register Name Identifier Request message (step 468), thereby registering the name identifier assigned by the service provider ("SPProvidedNameIdentifier") to the principal. It should be noted that since the prior art Liberty Alliance specifications require that accounts be linked off of a minimum of an "IdPProvidedNameIdentifier", the identity provider will also create this name identifier value, register it for the user, and attempt to return it to the service provider. This allows the linking of the identities of the principal such that the user's accounts are linked together through the information that is held by the identity provider and the service provider. The identity provider then optionally terminates any user/client session that may have been created at the identity provider (step 470).

After processing the Register Name Identifier Request message, the Register Name Identifier service at the identity provider responds by sending an HTTP redirect message (HTTP Response message with status/reason code "302") to the client (step 472). This message also includes the identity provider's name identifier ("IdPProvidedNameIdentifier"); this allows the service provider to talk to the identity provider about the user using the "IdPProvidedNameIdentifier" data value.

The redirect message redirects the client to the service provider using a return URI that was previously provided by the service provider to the identity provider. The return URI is specified in the "Location" HTTP header of the redirect message. The "Location" HTTP header of the redirect message also includes a query component, e.g., appended to a URI and demarcated within the URI with a "?" character, that contains the "<lib:RegisterNameIdentifierResponse>" protocol message.

In response to receiving the redirect message from the identity provider, the client sends an HTTP Get message to the service provider as indicated by the URI in the HTTP redirect message from the identity provider (step 474). The client initiates the completion of the Register Name Identifier operation at the identity provider because the URI in the HTTP Get message from the client to the identity provider still contains the attached "<lib:RegisterNameIdentifierResponse>" message. The identity provider processes the Register Name Identifier Response message from the service provider that was redirected through the client (step 476).

Assuming that the response from the identity provider indicates a successful Register Name Identifier operation, the service provider sends a response to the client for the federation operation that was originally requested at step 458 (step 478); this response may contain an indication of the successful completion of the account-linking operation along with links to federated resources at the service provider, e.g., in the form of hyperlinks that are embedded within a web page that is returned to a web browser that is executing on the client.

The user may then operate the web browser at the client to select or to access a controlled or protected resource at the service provider (step 480). Given that the user's accounts at the identity provider and the service provider are now linked together, the identity provider may interact with the client and/or the service provider to perform an authentication operation (step 482); for example, the identity provider may provide an authentication token as requested by the service provider through HTTP redirection messages via the client. Assuming that the authentication operation is successful, the service provider sends an HTTP Response message to the client (step 484). The response from the service provider to the client may be a web page that represents the third-party portal services that are specifically available to the user based on the user's identity; in other words, the web page preferably contains information content that is specifically tailored for the user. In addition, the web page may include links to protected or controlled resources at the service provider in a federated manner.

As noted above, step 470 is optional. The identity provider ought not terminate this session if the service provider is going to subsequently manage a session for the user. This follows because the service provider ought to ensure that this session is bound to the identity provider and is controllable, such as with an identity-provider-initiated single logout request. If the identity provider session is terminated, then this is not possible.

Conclusion

The advantages of the present invention should be apparent in view of the detailed description of the invention that is provided above. With the Register Name Identifier profile in the prior art Liberty Alliance specifications, a malicious user may act as an identity provider or a service provider to spoof a Register Name Identifier operation with respect to a user's account, thereby creating a condition such that the malicious user has access to a user's account. With the present invention, an additional authentication operation is required during a Register Name Identifier operation, thereby making a Register Name Identifier profile more secure such that a service provider or an identity provider may trust a single-sign-on event received by an identity provider or a service provider.

Moreover, the present invention provides a secure Register Name Identifier profile that allows the secure account binding of a user to be initiated outside of the flow of a single-sign-on operation and allows this binding to be initiated by either the identity provider or by the service provider. This feature is not described in the prior art Liberty Alliance specifications, and it would not be possible to include this feature in a system that is implemented in accordance with the prior art Liberty Alliance specifications without also requiring additional operations to force the service provider to request the federation/single-sign-on operation in response to a user's request from the identity provider.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for performing an operation within a federated computing environment, the method comprising:
    receiving a register name identifier (RNI) request for a principal from a first federated entity at a second federated entity within the federated computing environment;
    in response to receiving the register name identifier (RNI) request for the principal, performing an authentication operation at the second federated entity for the principal;
    in response to successfully completing the authentication operation, registering or modifying within an RNI profile a name identifier from the received register name identifier (RNI) request at the second federated entity; and
    sending a register name identifier (RNI) response from the second federated entity to the first federated entity.

2. The method of claim 1 wherein the first federated entity is an identity provider and the second federated entity is a service provider.

3. The method of claim 1 wherein the first federated entity is a service provider and the second federated entity is an identity provider.

4. The method of claim 1 further comprising:
    linking a first account for the principal at the first federated entity with a second account for the principal at the second federated entity such that information about the first federated entity can be offered to the principal by the second federated entity.

5. The method of claim 1 further comprising:
    linking a first account for the principal at the first federated entity with a second account for the principal at the second federated entity such that the first federated entity and the second federated entity can perform a single-sign-on operation on behalf of the principal.

6. The method of claim 1 further comprising:
    interacting directly with the principal by the second federated entity in order to perform the authentication operation.

7. The method of claim 1 further comprising:
    performing a single-sign-on operation as the authentication operation at the second federated entity based on single-sign-on information that has been received from the first federated entity along with the register name identifier request.

8. The method of claim 1 further comprising:
    requesting single-sign-on information by the second federated entity from the first federated entity in order to perform the authentication operation.

9. The method of claim 1 further comprising:
    receiving a single-sign-on request at the second federated entity from the first federated entity prior to receiving the register name identifier request for the principal at the second federated entity.

10. An apparatus for performing an operation within a federated computing environment, the apparatus comprising:
    a processor;
    a computer memory holding computer program instructions which when executed by the processor perform a method comprising:
        receiving a register name identifier (RNI) request for a principal from a first federated entity at a second federated entity within the federated computing environment;
        performing, in response to receiving the register name identifier (RNI) request for the principal, an authentication operation at the second federated entity for the principal;
        in response to successfully completing the authentication operation, registering or modifying, within an RNI profile, a name identifier from the received register name identifier (RNI) request at the second federated entity; and
        sending a register name identifier (RNI) response from the second federated entity to the first federated entity.

11. The apparatus of claim 10 wherein the first federated entity is an identity provider and the second federated entity is a service provider.

12. The apparatus of claim 10 wherein the first federated entity is a service provider and the second federated entity is an identity provider.

13. The apparatus of claim 10 wherein the method further comprises:
    linking a first account for the principal at the first federated entity with a second account for the principal at the second federated entity such that information about the first federated entity can be offered to the principal by the second federated entity.

14. The apparatus of claim 10 wherein the method further comprises:
    linking a first account for the principal at the first federated entity with a second account for the principal at the second federated entity such that the first federated entity and the second federated entity can perform a single-sign-on operation on behalf of the principal.

15. The apparatus of claim 10 wherein the method further comprises:
    interacting directly with the principal by the second federated entity in order to perform the authentication operation.

16. The apparatus of claim 10 wherein the method further comprises:
    performing a single-sign-on operation as the authentication operation at the second federated entity based on single-sign-on information that has been received from the first federated entity along with the register name identifier request.

17. The apparatus of claim 10 wherein the method further comprises:
    requesting single-sign-on information by the second federated entity from the first federated-entity in order to perform the authentication operation.

18. The apparatus of claim 10 wherein the method further comprises:

receiving a single-sign-on request at the second federated entity from the first federated entity prior to receiving the register name identifier request for the principal at the second federated entity.

19. A computer program product on a non-transitory computer readable storage medium for performing an operation within a federated computing environment, the computer program product holding computer program instructions which when executed by a data processing system perform a method comprising:

receiving a register name identifier (RNI) request for a principal from a first federated entity at a second federated entity within the federated computing environment;

performing, in response to receiving the register name identifier (RNI) request for the principal, an authentication operation at the second federated entity for the principal;

in response to successfully completing the authentication operation, registering or modifying, within an RNI profile, a name identifier from the received register name identifier (RNI) request at the second federated entity; and sending a register name identifier (RNI) response from the second federated entity to the first federated entity.

20. The computer program product of claim 19 wherein the first federated entity is an identity provider and the second federated entity is a service provider.

21. The computer program product of claim 19 wherein the first federated entity is a service provider and the second federated entity is an identity provider.

22. The computer program product of claim 19 wherein the method further comprises:

linking a first account for the principal at the first federated entity with a second account for the principal at the second federated entity such that information about the first federated entity can be offered to the principal by the second federated entity.

23. The computer program product of claim 19 wherein the method further comprises:

linking a first account for the principal at the first federated entity with a second account for the principal at the second federated entity such that the first federated entity and the second federated entity can perform a single-sign-on operation on behalf of the principal.

24. The computer program product of claim 19 wherein the method further comprises:

interacting directly with the principal by the second federated entity in order to perform the authentication operation.

25. The computer program product of claim 19 wherein the method further comprises:

performing a single-sign-on operation as the authentication operation at the second federated entity based on single-sign-on information that has been received from the first federated entity along with the register name identifier request.

26. The computer program product of claim 19 wherein the method further comprises:

requesting single-sign-on information by the second federated entity from the first federated entity in order to perform the authentication operation.

27. The computer program product of claim 19 wherein the method further comprises:

receiving a single-sign-on request at the second federated entity from the first federated entity prior to receiving the register name identifier request for the principal at the second federated entity.

28. The method as described in claim 1 wherein the authentication operation is performed at the second federated entity for the principal to determine whether the RNI request is trustworthy.

29. The apparatus as described in claim 10 wherein the authentication operation is performed at the second federated entity for the principal to determine whether the RNI request is trustworthy.

30. The computer program product as described in claim 19 wherein the authentication operation is performed at the second federated entity for the principal to determine whether the RNI request is trustworthy.

* * * * *